United States Patent
Shinotsuka

(10) Patent No.: US 11,486,817 B2
(45) Date of Patent: Nov. 1, 2022

(54) DETECTING DEVICE, DETECTING UNIT, AND DETECTING SYSTEM

(71) Applicant: Michiaki Shinotsuka, Kanagawa (JP)

(72) Inventor: Michiaki Shinotsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 17/060,376

(22) Filed: Oct. 1, 2020

(65) Prior Publication Data

US 2021/0131954 A1    May 6, 2021

(30) Foreign Application Priority Data

Oct. 30, 2019 (JP) .............................. JP2019-197894
Jun. 19, 2020 (JP) .............................. JP2020-106486

(51) Int. Cl.
  *G01N 21/25* (2006.01)
  *G01J 5/00* (2022.01)
  (Continued)

(52) U.S. Cl.
  CPC .......... *G01N 21/256* (2013.01); *G01J 5/0025* (2013.01); *G01J 5/0803* (2013.01);
  (Continued)

(58) Field of Classification Search
  CPC ...... G01N 21/256; G01S 17/04; G01J 5/0025; G01J 5/0803; A01M 1/026; A01M 31/002; G08B 13/187
  See application file for complete search history.

(56) References Cited

U.S. PATENT DOCUMENTS 9,305,963 B2 * 4/2016 Balonek ................... H04N 5/33
10,197,439 B2 * 2/2019 Horsch ..................... G01V 8/20
(Continued)

FOREIGN PATENT DOCUMENTS

JP       4688331       5/2011
JP    2020-071153      5/2020
(Continued)

OTHER PUBLICATIONS

Cambra et al., Low Cost Wireless Sensor Networks for Rodent Detection, Sep. 2017, 105h IFIP Wireless & Mobile Networking Conference, pp. 1-7 (Year: 2017).*
(Continued)

*Primary Examiner* — David P Porta
*Assistant Examiner* — Jeremy S Valentiner
(74) *Attorney, Agent, or Firm* — IPUSA, PLLC

(57) ABSTRACT

In a detecting device, infrared light is emitted by a first source in a detection target space; second light of a wavelength different from the infrared light is emitted by a second source in a direction different from a direction of the infrared light being emitted by the first source. A reflecting section provided in the direction of the second light being emitted reflects the second light. A light receiver receives infrared light emitted by the first source and reflected by the object, and receives infrared light radiating from the object as a result of the object being irradiated with the infrared light emitted by the first source and being irradiated with the second light emitted by the second source and reflected by the reflecting section. A detector detects the object based on the infrared light received by the light receiver.

14 Claims, 26 Drawing Sheets

(51) Int. Cl.
  *G01S 17/04*  (2020.01)
  *A01M 1/02*  (2006.01)
  *G08B 13/187*  (2006.01)
  *G01J 5/0803*  (2022.01)
  *A01M 31/00*  (2006.01)

(52) U.S. Cl.
  CPC .............. *G01S 17/04* (2020.01); *A01M 1/026* (2013.01); *A01M 31/002* (2013.01); *G08B 13/187* (2013.01)

(56) References Cited

U.S. PATENT DOCUMENTS

2001/0017321 A1* 8/2001 Knowles ............ G06K 7/10851
                                                    235/462.44
2016/0270364 A1* 9/2016 Woolf .................. A61B 5/1105

FOREIGN PATENT DOCUMENTS

JP           2020071153 A  *  5/2020  ............... G01V 8/20
WO       WO-2014073905 A1  *  5/2014  ............ G01J 1/0414

OTHER PUBLICATIONS

Ou-Yang et al., An infrared range camera-based approach for three-dimensional locomotion tracking and pose reconstruction in a rodent, Sep. 30, 2011, Journal of Neuroscience Methods, vol. 201, Iss. 1, pp. 116-123 (Year: 2011).*

* cited by examiner

FIG.9

|  | OUTPUT LEVEL (V) |
|---|---|
| YOUNG ANIMAL | 0.5 |
| SMALL-SIZE ADULT ANIMAL | 0.8 |
| MEDIUM-SIZE ADULT ANIMAL | 3 |
| LARGE-SIZE ADULT ANIMAL | 5 |

FIG.11

| REFLECTING SECTION | | REFLECTANCE (%) | | DETECTABLE DISTANCE (cm) |
|---|---|---|---|---|
| COLOR | MATERIAL | WAVELENGTH (nm) 520 | 950 | |
| BLUE | VINYL CHLORIDE SHEET (0.5 mm) | 4.7 | 4.5 | 32 |
| GREEN | | 4.8 | 4.1 | 33 |
| BLACK | | 0 | 0.02 | 0 |
| LIGHT BLUE | | 4.5 | 4.4 | 34 |
| YELLOW | | 3.4 | 4.1 | 31 |
| WHITE | | 10.2 | 10.5 | 35 |
| WHITE | PAPER | 0.8 | 1 | 32 |
| SILVER | ALUMINUM | 91.8 | 94.2 | 44 |
| 3D WHITE | ABS | 10 | 10.2 | 34 |
| BLACK | CARDBOARD | 0.5 | 0.72 | 27 |
| LIGHT BROWN | | 10 | 10.2 | × |

FIG.14

| SPACE BETWEEN CASE AND UPPER WALL L1 (mm) | OBJECT DETECTION AT 1 cm OR MORE FROM JUST BELOW LIGHT RECEIVER |
|---|---|
| 0 | NOT SATISFACTORY |
| 2 | SOMEWHAT SATISFACTORY |
| 4 | SATISFACTORY |
| 6 | VERY SATISFACTORY |
| 8 | VERY SATISFACTORY |

NOT SATISFACTORY: NOT DETECTED
SOMEWHAT SATISFACTORY: THE NUMBER OF DETECTED PULSES IS SMALL
SATISFACTORY: DETECTED
VERY SATISFACTORY: DETECTED EVEN AROUND JUST BELOW LIGHT RECEIVING UNIT

FIG.16A

| | DISTANCE FROM SENSOR (cm) | 0 | | 10 | | 20 | | 30 | |
|---|---|---|---|---|---|---|---|---|---|
| | OBJECT HEIGHT | SMALLER THAN 1 cm | GREATER THAN OR EQUAL TO 1 cm | SMALLER THAN 1 cm | GREATER THAN OR EQUAL TO 1 cm | SMALLER THAN 1 cm | GREATER THAN OR EQUAL TO 1 cm | SMALLER THAN 1 cm | GREATER THAN OR EQUAL TO 1 cm |
| AMBIENT TEMPERATURE (°C) | 16 | NOT SATISFACTORY | SATISFACTORY | NOT SATISFACTORY | SATISFACTORY | NOT SATISFACTORY | SATISFACTORY | NOT SATISFACTORY | SATISFACTORY |
| | 25 | NOT SATISFACTORY | SATISFACTORY | NOT SATISFACTORY | SATISFACTORY | NOT SATISFACTORY | SATISFACTORY | NOT SATISFACTORY | SATISFACTORY |
| | 34 | NOT SATISFACTORY | SATISFACTORY | NOT SATISFACTORY | SATISFACTORY | NOT SATISFACTORY | SATISFACTORY | NOT SATISFACTORY | SATISFACTORY |

SATISFACTORY: DETECTED
NOT SATISFACTORY: NOT DETECTED

FIG.16B

| | DISTANCE FROM SENSOR (cm) | 0 | | 10 | | 20 | | 30 | |
|---|---|---|---|---|---|---|---|---|---|
| | OBJECT HEIGHT | SMALLER THAN 1 cm | GREATER THAN OR EQUAL TO 1 cm | SMALLER THAN 1 cm | GREATER THAN OR EQUAL TO 1 cm | SMALLER THAN 1 cm | GREATER THAN OR EQUAL TO 1 cm | SMALLER THAN 1 cm | GREATER THAN OR EQUAL TO 1 cm |
| AMBIENT TEMPERATURE (°C) | 16 | SATISFACTORY | SATISFACTORY | SATISFACTORY | SATISFACTORY | SATISFACTORY | SATISFACTORY | SATISFACTORY | SATISFACTORY |
| | 25 | NOT SATISFACTORY | SATISFACTORY | NOT SATISFACTORY | SATISFACTORY | NOT SATISFACTORY | SATISFACTORY | NOT SATISFACTORY | NOT SATISFACTORY |
| | 34 | NOT SATISFACTORY | SATISFACTORY | NOT SATISFACTORY | SATISFACTORY | NOT SATISFACTORY | SATISFACTORY | NOT SATISFACTORY | NOT SATISFACTORY |

SATISFACTORY: DETECTED
NOT SATISFACTORY: NOT DETECTED

FIG.17

| SENSOR ANGLE | EVALUATION | COMMENTS |
|---|---|---|
| 5 | NOT SATISFACTORY | |
| 10 | SOMEWHAT SATISFACTORY | BARELY DETECTED |
| 11 | VERY SATISFACTORY | SATISFACTORY FOR WHOLE BOX |
| 12 | VERY SATISFACTORY | SATISFACTORY FOR WHOLE BOX |
| 15 | VERY SATISFACTORY | SATISFACTORY FOR WHOLE BOX |
| 16 | SATISFACTORY | DETECTION IS SOMEWHAT NOT SATISFACTORY |
| 17 | SOMEWHAT SATISFACTORY | |
| 20 | NOT SATISFACTORY | |

FIG.18

| | REFLECTANCE (%) | | | DETECTION RESULT |
|---|---|---|---|---|
| | GREEN LED 520 nm | YELLOW LED 570 nm | RED LED 780 nm | |
| LIGHT BLUE (RESIN OF 0.5 mm) | 4.9 | 5.2 | 4.5 | SATISFACTORY FOR 34 cm FROM SENSOR |
| BLACK (RESIN OF 0.5 mm) | 0.01 | 0.02 | 0.02 | NOT SATISFACTORY |
| BLACK, INFRARED RAY ABSORBING MATERIAL | 0 | 0 | 0 | NOT SATISFACTORY |

NOT SATISFACTORY: NO REFLECTANCE TO LED LIGHT AND NO RESPONSE

FIG.24

| DETECTING DEVICE | DETECTED OR NOT | DEVICE POSITION | DETECTED DATE AND TIME |
|---|---|---|---|
| 120a1 | NOT DETECTED | 1F – SOUTH | – |
| 120a2 | DETECTED | 1F – NORTH | 2018/06/11-22:35 |
| ... | ... | ... | ... |
| 120ai | NOT DETECTED | 1F – EAST | – |
| 120b1 | DETECTED | 2F – SOUTH | 2018/06/12-3:29 |
| 120b2 | NOT DETECTED | 2F – NORTH | – |
| ... | ... | ... | ... |
| 120bj | NOT DETECTED | 2F – WEST | – |
| 120c1 | DETECTED | 3F – SOUTH 1 | 2018/06/13-19:02 |
| 120c2 | DETECTED | 3F – SOUTH 2 | 2018/06/13-20:07 |
| 120c3 | DETECTED | 3F – SOUTH 3 | 2018/06/13-19:30 |
| 120c4 | NOT DETECTED | 3F – NORTH | – |
| ... | ... | ... | ... |
| 120ck | NOT DETECTED | 3F – EAST | – |
| 120d1 | NOT DETECTED | 4F – SOUTH | – |
| 120d2 | NOT DETECTED | 4F – NORTH | – |
| ... | ... | ... | ... |
| 120dm | NOT DETECTED | 4F – WEST | – |

DETECTING DEVICE, DETECTING UNIT, AND DETECTING SYSTEM

BACKGROUND OF THE INVENTION

1. Field of the Invention

The present invention relates to a detection device, a detecting unit, and a detecting system.

2. Description of the Related Art

In the related art, a detecting device emits infrared light and detects an object based on a result of receiving reflected light of the infrared light from the object. For example, Japanese Patent No. 4688331 discloses an anomaly detecting device for detecting a change in an amount of infrared light reflected by an object and determining that an anomaly has occurred when a vibration is detected within a predetermined period of time before or after the detection.

SUMMARY OF THE INVENTION

According to an embodiment of the present invention, a detecting device for detecting an object from a detection target space, includes a first light source configured to emit infrared light in the detection target space; a second light source configured to emit second light of a wavelength different from the infrared light in a direction different from a direction in which the first light source emits the infrared light; a reflecting section provided in the direction in which the second light source emits the second light and configured to reflect the second light; a light receiver configured to receive reflected infrared light emitted by the first light source and reflected by the object, and to receive radiating infrared light radiating from the object as a result of the object being irradiated with the infrared light emitted by the first light source and being irradiated with the second light emitted by the second light source and reflected by the reflecting section; and a detector configured to detect the object based on the reflected infrared light and the radiating infrared light received by the light receiver.

Other objects, features and advantages of the present invention will become more apparent from the following detailed description when read in conjunction with the accompanying drawings.

BRIEF DESCRIPTION OF DRAWINGS

FIG. 9 is a diagram depicting an example of a determination table used for determining a size of an object by a size determining unit;

FIG. 11 is a diagram depicting relationships among a color and a material of the reflecting section, reflectance of the reflecting section, and an object detectable distance of the light receiver;

FIG. 14 is a diagram illustrating an object detection result of the detecting device according to the first embodiment for each distance;

FIGS. 16A and 16B are views each depicting an object detection result with respect to ambient temperature of the detecting device according to the first embodiment;

FIG. 17 depicts relationships between an inclined angle of the light receiver and a detectable distance of the light receiver:

FIG. 18 is a view depicting relationships among a color and a material of the reflecting section, and reflectance of the reflecting section;

FIG. 24 depicts a first example of collectively processed data according to the second embodiment of the present invention;

DESCRIPTION OF EMBODIMENTS

With respect to the above-described detecting device in the related art, infrared light output intensity is changed for changing an object detectable distance.

In consideration of the above-described situation of the related art, an object of an embodiment of the present invention is to enable changing an object detectable distance without changing infrared light output intensity.

According to the embodiment of the present invention, a detecting device for detecting an object from a detection target space, includes a first light source configured to emit infrared light in the detection target space; a second light source configured to emit second light of a wavelength different from the infrared light in a direction different from a direction in which the first light source emits the infrared light; a reflecting section, in the direction in which the second light source emits the second light, configured to reflect the second light; a light receiver configured to receive reflected infrared light emitted by the first light source and reflected by the object, and to receive radiating infrared light radiating from the object as a result of the object being irradiated with the infrared light emitted by the first light source and being irradiated with the second light emitted by the second light source and reflected by the reflecting section; and a detector configured to detect the object based on the reflected infrared light and the radiating infrared light received by the light receiver.

According to the embodiment of the present invention, an object detectable distance can be changed without changing infrared light output intensity.

Hereinafter, embodiments of the present invention will be described with reference to the drawings. For convenience, hereinafter, a Z-axis direction in drawings is set to an upward direction, a Y-axis direction in drawings is set to a forward direction, and an X-axis direction in drawings is set to a leftward horizontal direction.

First Embodiment (Configuration of Detecting Unit 10)

Figure 1:
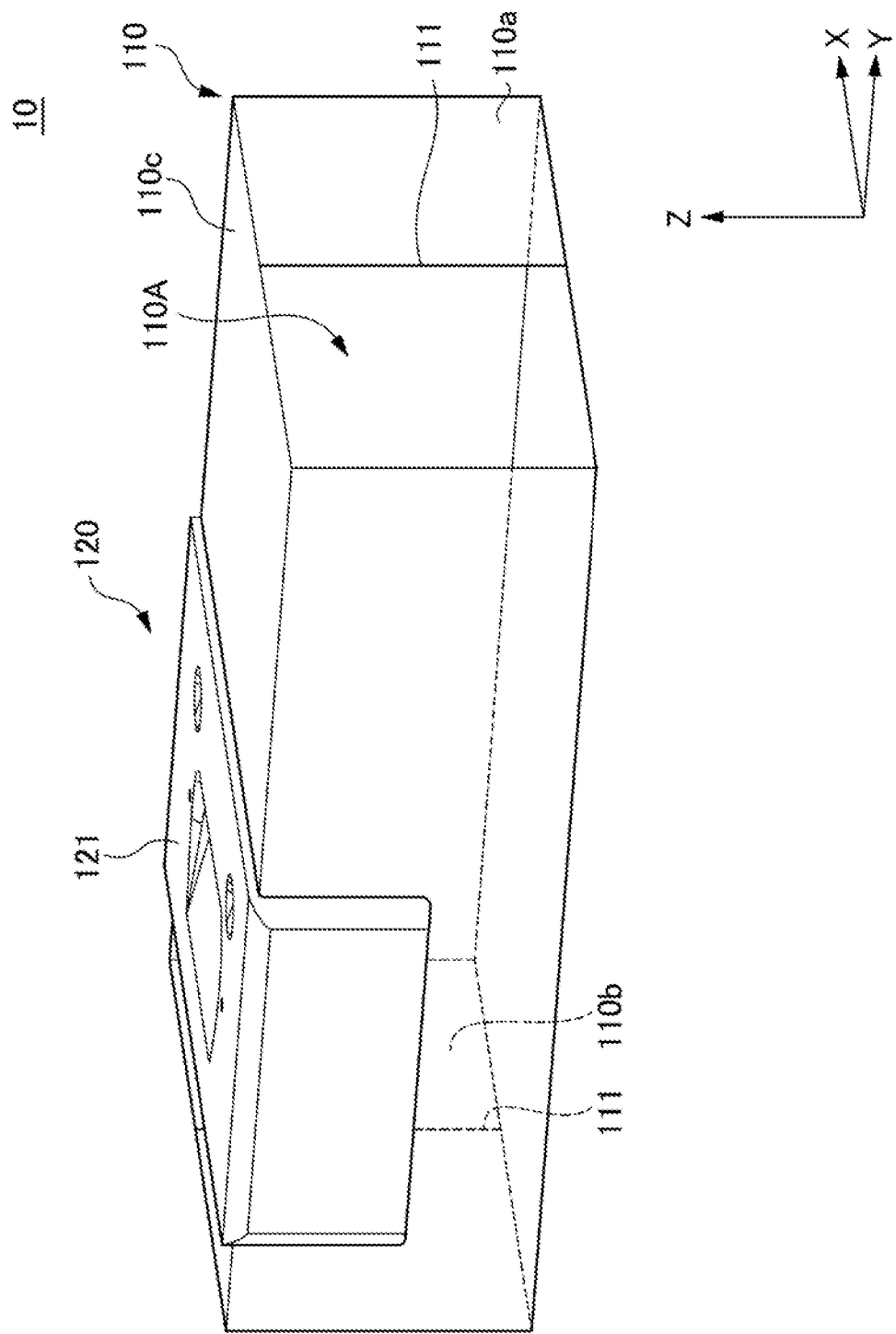
FIG. 1 is a perspective view of a detecting unit according to a first embodiment of the present invention.
Figure 2:
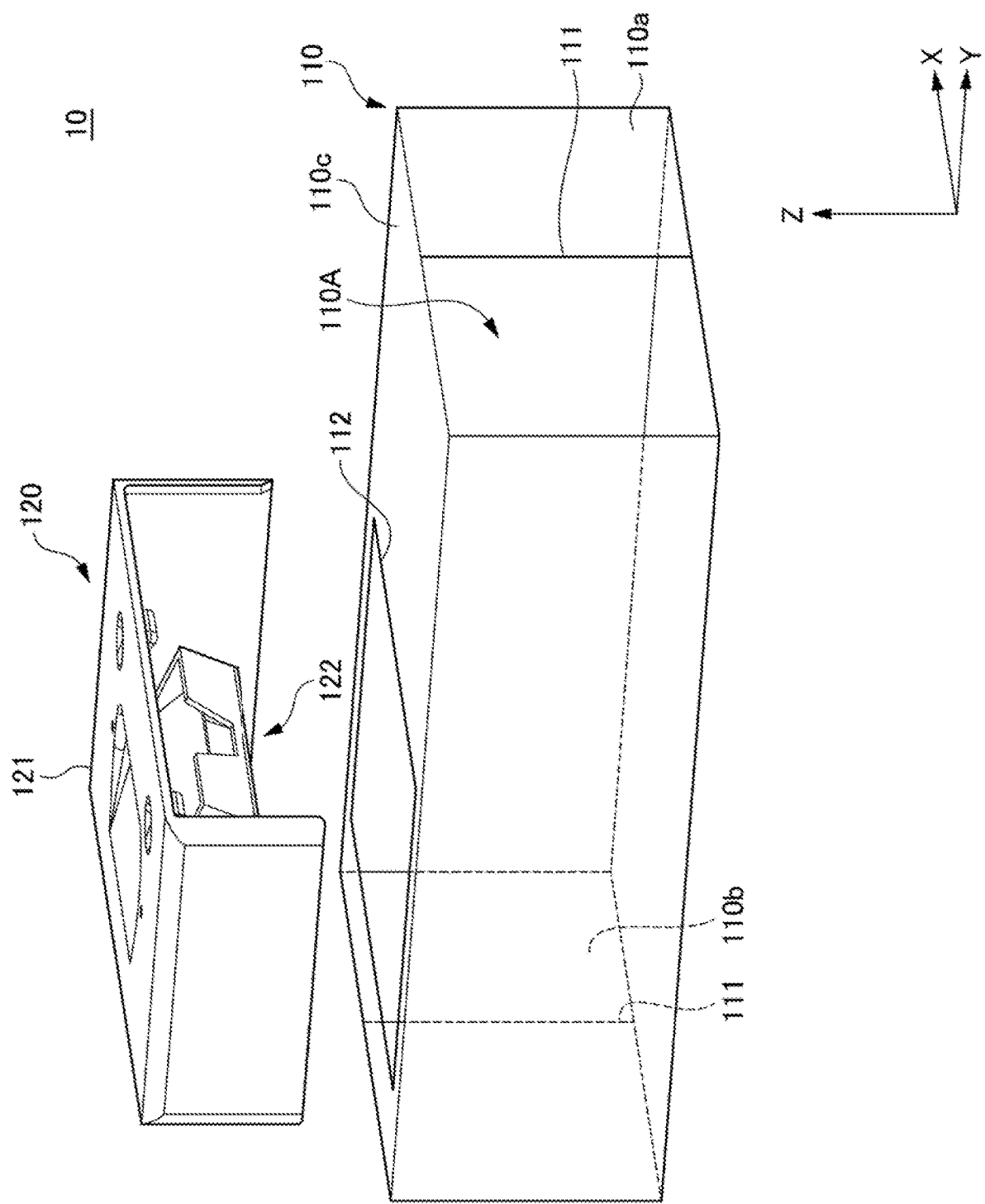
FIG. 2 is another perspective view of the detecting unit according to the first embodiment of the present invention.

FIGS. 1 and 2 are perspective views of a detecting unit 10 according to a first embodiment of the present invention. As depicted in FIGS. 1 and 2, the detecting unit 10 includes a housing 110 and a detecting device 120. FIG. 1 illustrates a state in which the detecting device 120 is mounted to an upper wall 110c of the housing 110. FIG. 2 illustrates a state where the detecting device 120 has been removed from the upper wall 110c of the housing 110.

<Housing 110>

The housing 110 is a box-like member having a rectangular parallelepiped shape (but not limited to a rectangular parallelepiped shape) where a longitudinal direction is a Y-axis direction. The interior of the housing 110 is a detection target space 110A from which an object is detected. A rectangular opening 111 is formed at a right side (in the direction opposite to the X-axis direction) of each of front and rear walls 110a and 110b of the housing 110. As a result, the housing 110 is able to allow an object to enter through the openings 111 in the detection target space 110A. The position, shape, and number of openings 111 are not limited to the position, shape, and number illustrated in FIGS. 1 and 2. An opening 112 having a rectangular shape (but not limited to a rectangular shape) is formed in the upper wall 110c of the housing 110.

<Detecting Device 120>

The detecting device 120 is a device capable of detecting an object entering the interior of the housing 110 using infrared light. The detecting device 120 has a base 121 and a detector 122. As depicted in FIG. 1, the detecting device 120 is mounted at an upper side in the housing 110 in such a manner that the upper wall 121A (see FIG. 3) of the base 121 covers an opening 112 formed in the upper wall 110c of the housing 110. Accordingly, the detecting device 120 is disposed in the detection target space 110A through the opening 112. Thus, the detecting device 120 is capable of detecting an object that enters the interior of the housing 110 by the detector 122 using infrared light. The base 121 of the detecting device 120 may be mounted at a lateral or longitudinal side in the housing 110. The detecting device 120 may be provided outside the housing 110 to detect an object inside the housing 110 through a transparent board. In this case, the interior surface of the detecting device 120 is preferably covered with a black material (for example, acrylic, vinyl chloride, paint, black metal, or the like). The transparent board may be provided at each of the detecting device 120 and the housing 110, and may be of an integral type. For example, the transparent board may be formed using an infrared-transparent material (for example, acrylic, vinyl chloride, glass, or the like).

(Configuration of Detecting Device 120)

Figure 3:
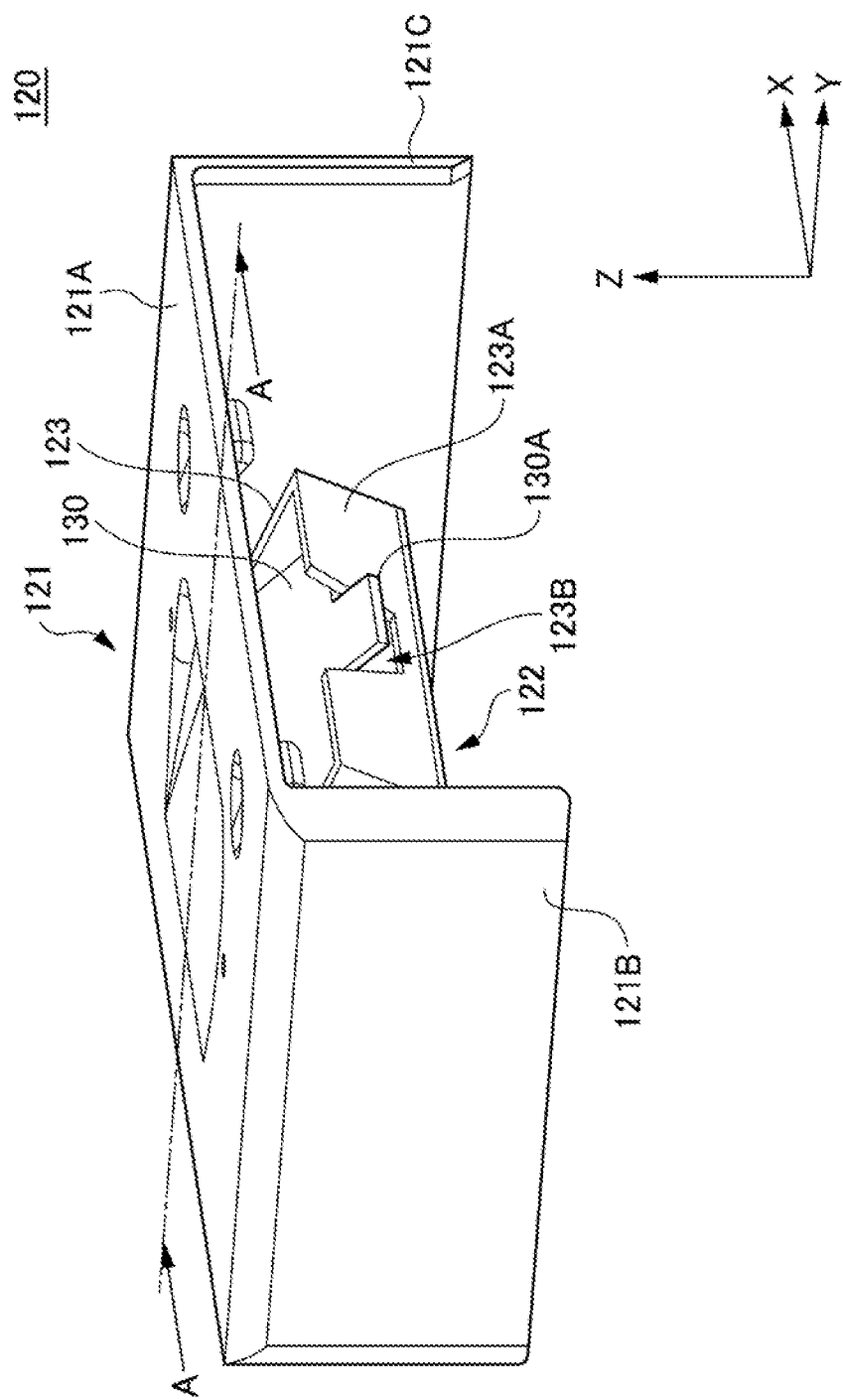
FIG. 3 is a perspective view of a detecting device according to the first embodiment of the present invention.
Figure 4:
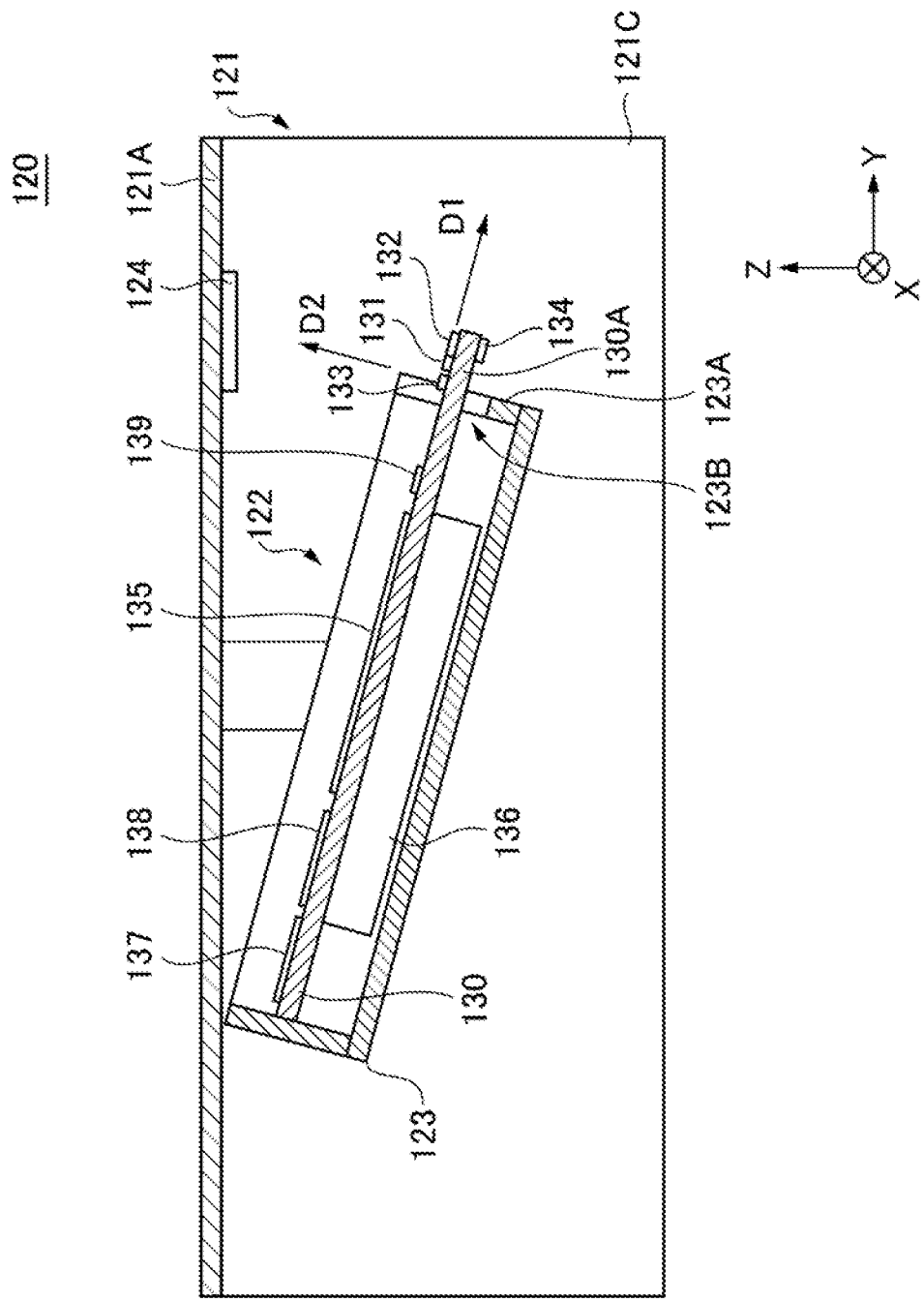
FIG. 4 is a side cross-sectional view of the detecting device according to the first embodiment of the present invention.
Figure 5:
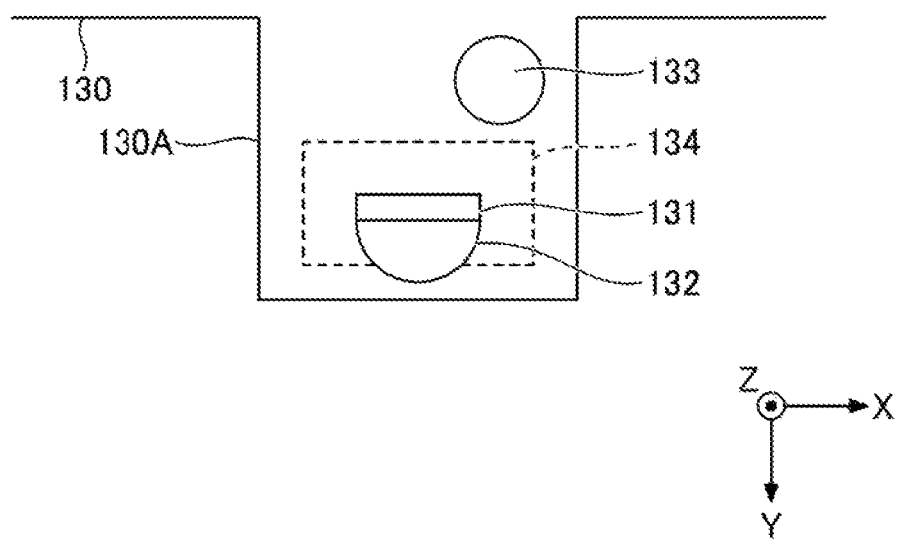
FIG. 5 is an enlarged view of a protrusion that a circuit board according to the first embodiment of the present invention has.

FIG. 3 is a perspective view of the detecting device 120 according to the first embodiment of the present invention. FIG. 4 is a side cross-sectional view (A-A cross sectional view of the detecting device 120 depicted in FIG. 3) of the detecting device 120 according to the first embodiment of the present invention. FIG. 5 is an enlarged view of a protrusion 130A of a circuit board 130 according to the first embodiment of the present invention. As depicted in FIGS. 3 and 4, the detecting device 120 includes the base 121 and the detector 122.

The base 121 holds the detector 122 and is a member for mounting the detector 122 to the housing 110. The base 121 has the upper wall 121A, a right wall 121B, and a left wall 121C. The upper wall 121A is a horizontal flat plate and has a rectangular shape viewed from the top (from the Z-axis direction). The right wall 121B is a flat and wall-like member extending downward from the right (in the direction opposite to the X-axis direction) edge of the upper wall 121A. The left side wall 121C is a flat and wall-like member extending downward from the left (in the X-axis direction) edge of the upper wall 121A. In the present embodiment, the base 121 is provided as another body with respect to the housing 110 (i.e., being able to be detachable). However, the base 121 is not limited to be another body. The base 121 may be integrally formed with the housing 110 (i.e., not being able to be detachable).

The detector 122 is a device for detecting an object that enters the interior of the housing 110 using infrared light. The detector 122 is fixed to the lower face (the face in the opposite direction of the Z-axis direction) of the upper wall 121A of the base 121 in a tilted manner in such a manner that the front side (in the Y-axis direction) is lower. The detector 122 is mounted to the housing 110 in such a manner that the detector 122 is disposed in a state of being tilted downward along the forward direction in the detection target space 110A.

The detector 122 includes a case 123 and a circuit board 130. The case 123 is a container-like member having a rectangular parallelepiped shape where the upper side is an opening. The case 123 is securely attached to the lower face of the upper wall 121A of the base 121 through a fastening device (for example, screws, rivets, an engagement mechanism, an adhesive, a double-sided tape, or the like) with the circuit board 130 contained therein.

The circuit board 130 is a flat plate-like member on which various electronic components are mounted. The circuit board 130 is fixedly mounted in the case 123. The circuit board 130 has a rectangular shape in plan view. The circuit board 130 has the protrusion 130A that protrudes forwardly from the center at the front (in the Y-axis direction) edge of the circuit board 130. The protrusion 130A extends forward (in the Y-axis direction) through a cut-out 123B formed in a front wall 123A of the case 123.

As depicted in FIG. 4, the upper face (the face in the Z-axis direction) of the circuit board 130 is equipped with an LED (Light emitting Diode) 131, a prism 132, an LED 133, a control circuit 135, a communication module 137, a GPS unit 138, and a temperature sensor 139. The LED 131, the prism 132, and the LED 133 are mounted to the upper face of the protrusion 130A.

As depicted in FIG. 4, a light receiver 134 and a power supply 136 are mounted on the lower face (the face in the opposite direction of the Z-axis direction) of the circuit board 130. The light receiver 134 is mounted to the lower face of the protrusion 130A.

The LED 131 is an example of a "first light source". The LED 131 emits infrared light forward (in the Y-axis direction). For example, in the present embodiment, the wavelength range of infrared light emitted by the LED 131 is approximately in the range between 800 nm and 1150 nm.

The prism 132 is provided in front of the LED 131 (in the Y-axis direction). As depicted in FIG. 5, the prism 132 has a front (in the Y-axis direction) face projecting forward (in the Y-axis direction). The prism 132 receives infrared light incident on the rear (the direction opposite to the Y-axis direction) face, radially diffuses the infrared light in the lateral directions, and emits the infrared light from the front (in the Y-axis direction) face in the forward direction (in the Y-axis direction, i.e., the arrow D1 direction depicted in FIG. 4).

The LED 133 is an example of a "second light source". The LED 133 emits second light that differs in wavelength from infrared light in an upward direction (the Z-axis direction, i.e., the arrow D2 direction depicted in FIG. 4). That is, the LED 133 emits the second light in a direction perpendicular to the upper face of the circuit board 130. In the present embodiment, visible light (but not limited to visible light) is used as the second light. For example, in the present embodiment, the wavelength range of the visible light emitted by the LED 133 is in a range approximately between 500 nm and 600 nm.

The circuit board 130 has a tilt angle of approximately 15 degrees with respect to the XY plane (horizontal plane) and is tilted downward along the forward direction. Accordingly, the emission direction of the infrared light emitted by the LED 131 and the prism 132 has a tilt angle of approximately 15 degrees with respect to the XY plane (horizontal plane) and tilts downward along the forward direction. The emission direction of the visible light emitted by the LED 133 has a tilt angle of approximately 15 degrees with respect to the XZ plane (vertical plane) and tilts forward (in the Y-axis direction).

The control circuit 135 is an example of a "controller" that controls the entire detecting device 120. The control circuit 135 may be, for example, a Field Programmable Gate Array (FPGA), a reconfigurable processor, an ASIC (Application Specific Integrated Circuit), or the like.

The light receiver 134 receives reflected light of infrared light emitted by the LED 131 and reflected by an object. The light receiver 134 receives also infrared light radiating from the object, as will be described. The light receiver 134 outputs a detection signal indicating the total intensity of the reflected infrared light and the radiating infrared light. An infrared light sensor, such as an infrared photodiode or an infrared light phototransistor, is used as the light receiver 134. A light receiving surface of the light receiver 134 is directed to the forward direction (the Y-axis direction).

The power supply 136 supplies the power to the components of the circuit board 130. The power supply 136 may be, for example, a primary battery (for example, dry battery, silver oxide battery, mercury battery, or the like) or a secondary battery (for example, lead battery, lithium ion secondary battery, nickel hydrogen battery, nickel cadmium battery, or the like). However, the power supply is not limited to these examples, and the power supply 136 may be an external power supply or the like, for example.

The communication module 137 transmits various data to and receives various data from an external apparatus by performing radio communication with the external apparatus. For example, the communication module 137 transmits detection result data indicating an object detection result to the external apparatus under the control of the control circuit 135. For example, Wi-Fi (registered tradename) or a radio Local Area Network (LAN) is used as a radio communication system that the communication module 137 uses.

The GPS unit 138 receives radio waves from GPS satellites and calculates the present position of the detecting device 120 and outputs position information indicating the present position. The GPS unit 138 outputs time information indicating the current time together with the position information.

The temperature sensor 139 detects the temperature of the detection target space 110A of the housing 110 and outputs temperature information indicating the temperature.

As depicted in FIG. 4, on the lower face of the upper wall 121A of the base 121, a thin-plate-like, sheet-like or thin-film-like (however, not limited to these examples) reflecting section 124 is provided at a position to be irradiated with visible light emitted by the LED 133. The reflecting section 124 reflects visible light emitted by the LED 133 forward (in the Y-axis direction) and downward (in the direction opposite to the Z-axis direction). The reflecting section 124 is formed of a material and has a color depending on a desired reflectance for the visible light. The reflectance of the reflecting section 124 to the visible light is at least greater than the reflectance of the inner surface of the housing 110 to the visible light. The reflecting section 124 may be detachable from the lower face of the upper wall 121A. In this case, the reflectance of the reflecting section 124 can be repeatedly changed each time by a change of the material and color used for the reflecting section 124. The installation position, the installation angle, and the reflectance of the reflecting section 124 are appropriately determined so that an object in the detection target space 110A can be irradiated with the visible light reflected by the reflecting section 124.

(Outline of Object Detecting Operation Performed by Detecting Device 120)

Figure 6:
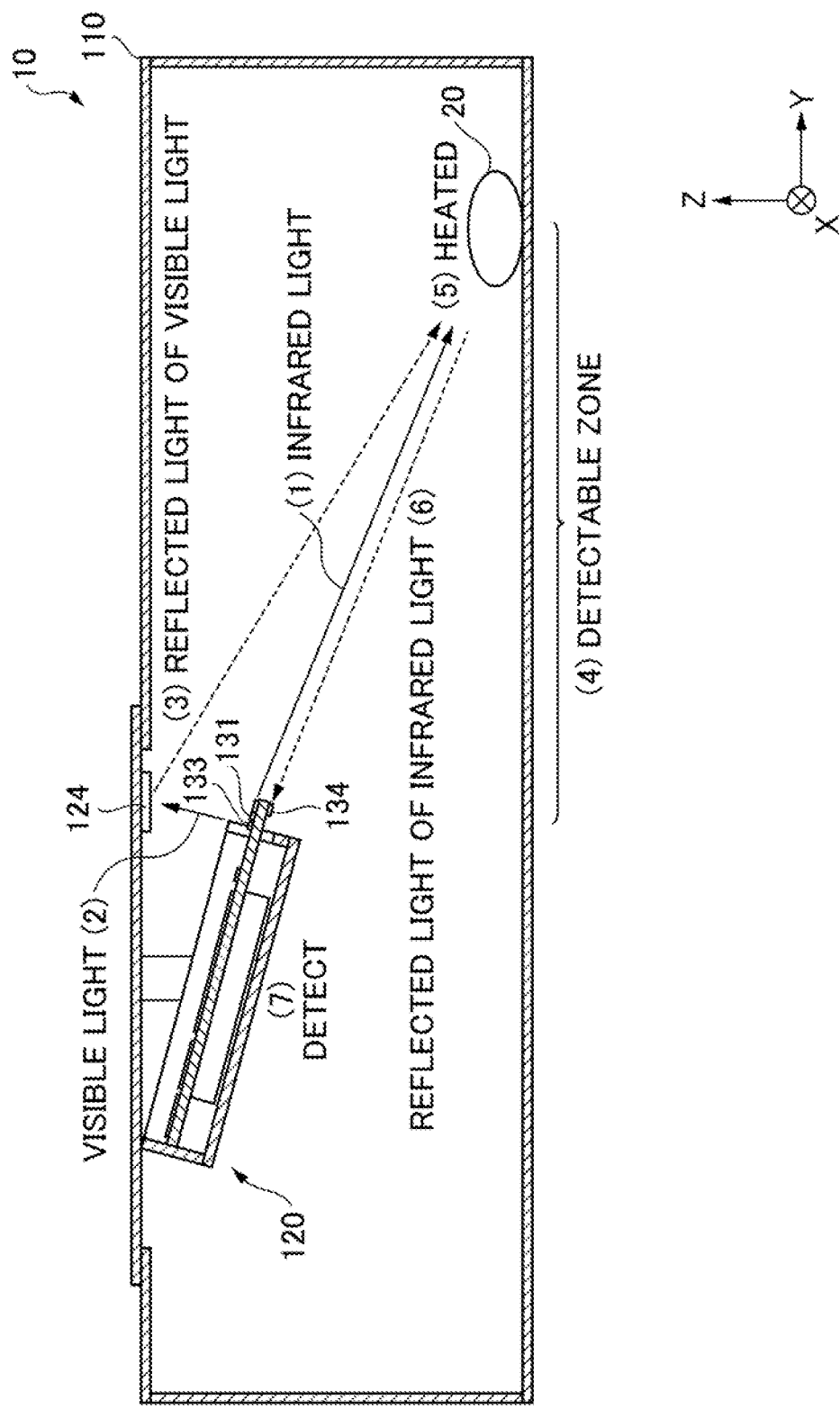
FIG. 6 is a view for illustrating an object detection operation performed by the detecting device according to the first embodiment of the invention.

FIG. 6 is a diagram for illustrating an outline of a detecting operation for an object 20 performed by the detecting device 120 according to the first embodiment of the present invention.

(1) First, when the power of the detecting device 120 is turned on, infrared light is emitted by the LED 131 forward (in the Y-axis direction) and downward (in the opposite direction of the Z-axis direction) in the detection target space 110A of the housing 110.

(2) At the same time, in the detection target space 110A, visible light is emitted by the LED 133 upward (in the Z-axis direction) and forward (in the Y-axis direction).

It should be noted that the power turning on and off of the detecting device 120 and driving and not driving of the LEDs 131 and 133 may be switchable by a user operation performed on the detecting device 120 or an external remote operation.

(3) The visible light emitted by the LED 133 is reflected by the reflecting section 124 forward (in the Y-axis direction) and downward (in the opposite direction of the Z-axis direction). The reflected light of visible light has light intensity corresponding to the reflectance of the reflecting section 124. Then, inside the detection target space 110A, a distance corresponding to the light intensity is reached by the reflected light forward (in the Y-axis direction) from the reflecting section 124.

(4) Accordingly, the detecting unit 10 according to the present embodiment has a range of reaching distance of visible light from the reflecting section 124 inside the detection target space 110A as an object detectable zone.

The interior surface of the housing 110 has light absorption for infrared light and visible light. That is, the interior surface of the housing 110 has reflectance of approximately 0% for infrared light and visible light. Thus, in the absence of an object 20 in the detectable zone, infrared light and visible light are absorbed by the inner surface of the housing 110 and thus, are not received by the light receiver 134 (i.e., there occurs no false object detection).

(5) When an object 20 enters the detectable zone, the surface of the object 20 is irradiated directly with infrared light emitted by the LED 131 and is irradiated with visible light reflected by the reflecting section 124 after being emitted by the LED 133, and thus, is heated as a result of being irradiated with the infrared light directly from the LED 131 and with the visible light emitted by the LED 133 and reflected by the reflecting section 124.

(6) As a result, in addition to the infrared light being reflected by the surface of the object 20 (reflected infrared light), the infrared light radiates from the surface of the object 20 as a result of being thus heated (radiating infrared light); these two types of infrared light is then received by the light receiver 134.

(7) As a result, a detection signal corresponding to the total light reception intensity of the reflected infrared light and the radiating infrared light is output from the light receiver 134, and the object 20 is detected by the detecting device 120.

(Reflectance of Inner Surface of Housing 110)

The detecting unit 10 according to the present embodiment is configured such that the reflectance of the inner surface (the inner surface of the upper wall, the inner surface of the bottom wall, and the inner surfaces of the side walls) of the housing 110 is less than 0.1% (a suitable example of reflectance that is not responsive to infrared light). Here, the "reflectance of the inner surface of the housing 110" is the ratio of the reflected infrared light (the outgoing light) to the light incident on the inner surface of the housing 110. Accordingly, the detecting unit 10 according to the present embodiment can avoid an object from being falsely detected because of reflected infrared light reflected from the inner surface of the housing 110 even though no object exists in the detection target space 110A. For example, a black ABS resin, styrene, corrugated cardboard, or the like can be used on the inner surface of the housing 110 to reduce the reflectance with respect to infrared light. In this case, the entire housing 110 may be made of any one of these materials, or only the interior surface of the housing 110 may be made of any one of these materials. For example, the inner surface of the housing 110 can be coated with any one of infrared light absorbing materials (for example, an infrared light absorbing material made of polyurethane resin) to reduce the reflectance with respect to infrared light (for example, less than 2%). In this case, the infrared light absorbing material may have a form of a plate, a sheet, a film, a paint, or the like. The "reflectance that is not responsive to infrared light" may be determined depending on the light sensitivity of the light receiver 134.

(Hardware Configuration of Detecting Device 120)

Figure 7:
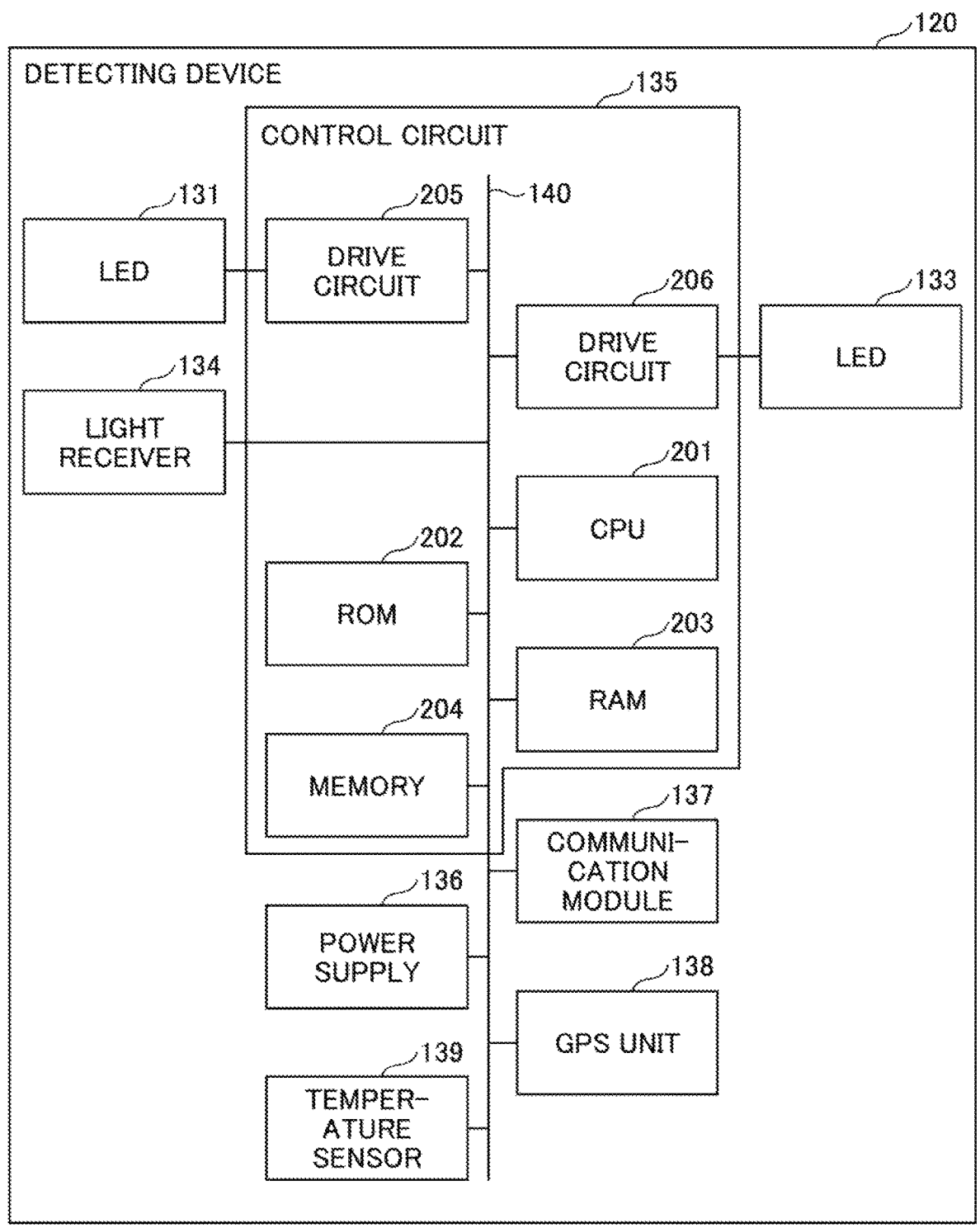
FIG. 7 is a block diagram for illustrating a hardware configuration of the detecting device according to the first embodiment of the present invention.

FIG. 7 is a block diagram illustrating a hardware configuration of the detecting device 120 according to the first embodiment of the present invention. As depicted in FIG. 7, the detecting device 120 includes the LED 131, the LED 133, the light receiver 134, the control circuit 135, the power supply 136, the communication module 137, the GPS unit 138, and the temperature sensor 139. These elements are communicatively connected to each other via communication paths 140 (for example, buses, wiring patterns, connectors, cables, or the like).

As depicted in FIG. 7, the control circuit 135 includes a central processing unit (CPU) 201, a read-only memory (ROM) 202, a random access memory (RAM) 203, a memory 204, a drive circuit 205, and a drive circuit 206.

The CPU 201 controls operation of the entire detecting device 120. The ROM 202 stores programs executed by the CPU 201. The RAM 203 is used as a work area of the CPU 201. The memory 204 stores various data. Examples of the memory 204 include a HDD (hard disk drive), a SSD (solid state drive), or the like.

The drive circuit 205 controls emission of infrared light by the LED 131. For example, the drive circuit 205 causes the LED 131 to emit infrared light by supplying power from the power supply 136 to the LED 131. The drive circuit 206 controls emission of visible light by the LED 133. For example, the drive circuit 206 supplies power to the LED 133 from the power supply 136 to cause the LED 133 to emit visible light.

(Functional Configuration of Control Circuit 135)

Figure 8:
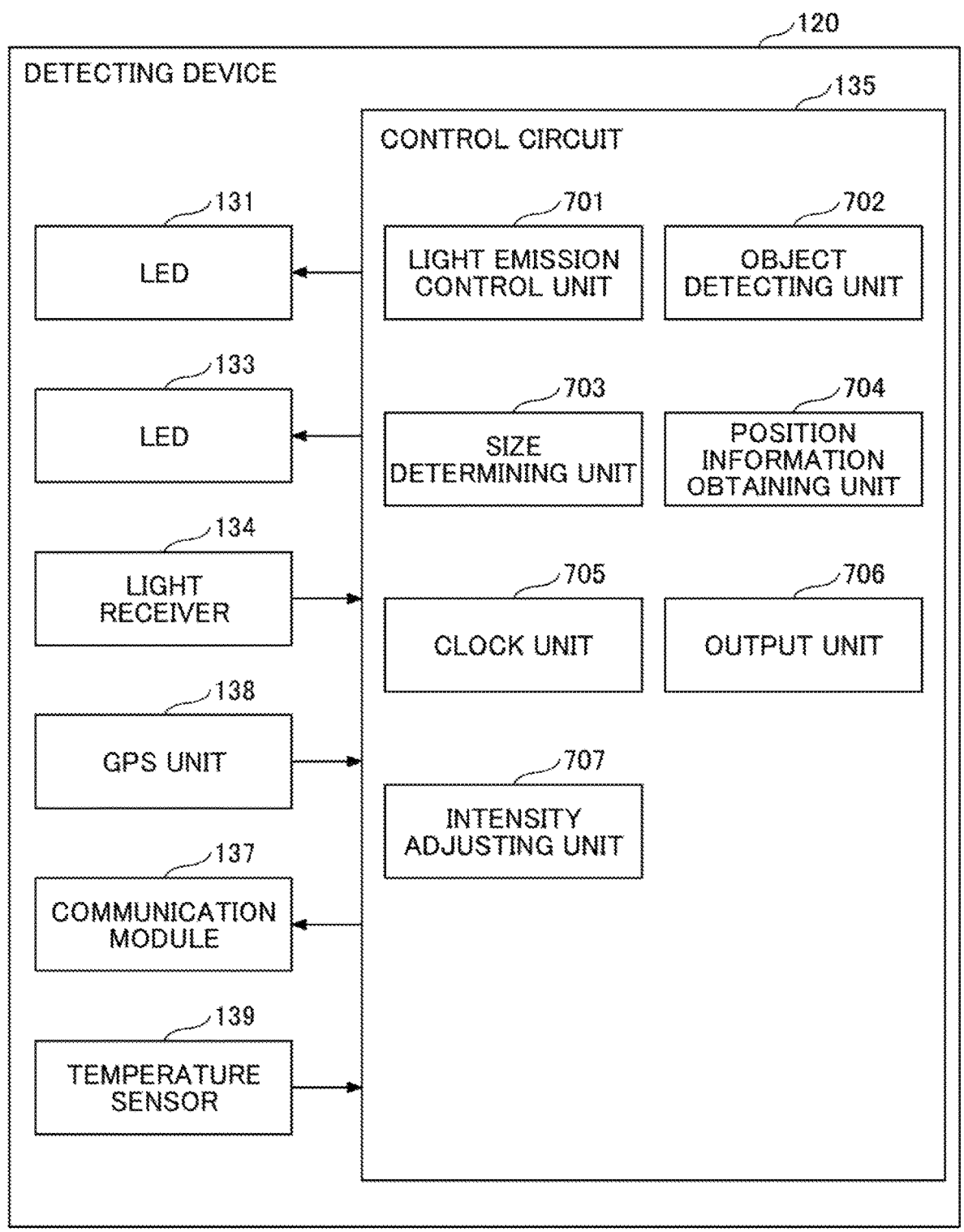
FIG. 8 is a block diagram for illustrating a functional configuration of a control circuit according to the first embodiment of the invention.

FIG. 8 is a block diagram illustrating a functional configuration of the control circuit 135 according to the first embodiment of the present invention. As depicted in FIG. 8, the control circuit 135 of the detecting device 120 includes a light emission control unit 701, an object detecting unit 702, a size determining unit 703, a position information obtaining unit 704, a clock unit 705, an output unit 706, and an intensity adjusting unit 707.

The light emission control unit 701 controls light emission of the LED 131 and light emission of the LED 133. For example, the light emission control unit 701 causes the LED 131 to emit infrared light and causes the LED 133 to emit visible light when the power of the detecting device 120 is turned on.

The object detecting unit 702 detects an object present in the detection target space 110A of the housing 110 based on a detection signal output from the light receiver 134. For example, when the output level of a detection signal output from the light receiver 134 is equal to or greater than a predetermined threshold, the object detecting unit 702 determines that "an object has been detected".

The size determining unit 703 determines the size of an object in the detection target space 110A of the housing 110 based on a detection signal output from the light receiver 134. Specifically, the size determining unit 703 determines in such a manner that the larger the output level of the detection signal output from the light receiver 134 is, the larger the size of an object present in the detection target space 110A is, based on a determination table illustrated in FIG. 9.

The position information obtaining unit 704 obtains position information indicating the present position of the detecting device 120 from the GPS unit 138. The clock unit 705 obtains the current time and outputs the time information indicating the current time.

The output unit 706 outputs an object detection result obtained by the object detecting unit 702 to an external apparatus through the communication module 137 in association with a determination result of the size of the object obtained by the size determining unit 703, the position information obtained by the position information obtaining unit 704, and the time information output from the clock unit 705 (or the GPS unit 138).

The intensity adjusting unit 707 obtains temperature information indicating the temperature of the detection target space 110A from the temperature sensor 139, and adjusts the intensity relationship between the infrared light emitted by the LED 131 and the visible light emitted by the LED 133 in accordance with the temperature of the detection target space 110A indicated by the temperature information.

For example, the light emission control unit 701 is implemented by the driving circuits 205 and 206 depicted in FIG. 7. For example, the object detecting unit 702, the size determining unit 703, the position information obtaining unit 704, the clock unit 705, the output unit 706, and the intensity adjusting unit 707 are implemented by execution of programs stored in the ROM 202 by the CPU 201 depicted in FIG. 7.

(Example of Determination Table for Determining Size of Object)

FIG. 9 is a diagram illustrating an example of the determination table used for determining the size of an object by the size determining unit 703. In the determination table illustrated in FIG. 9, the output level of a detection signal output from the light receiver 134 is set according to whether an object in the detection target space 110A is a young animal or an adult animal, and setting is made in such a manner that the larger the output level is, the larger the size is. The size determining unit 703 can determine the size of an object in the detection target space 110A from the output level of a detection signal output from the light receiver 134 based on the determination table depicted in FIG. 9. In FIG. 9, a mammal such as a mouse is used as an example of an object to be detected, but an object to be detected may be an arthropod such as an insect.

First Example

Figure 10:
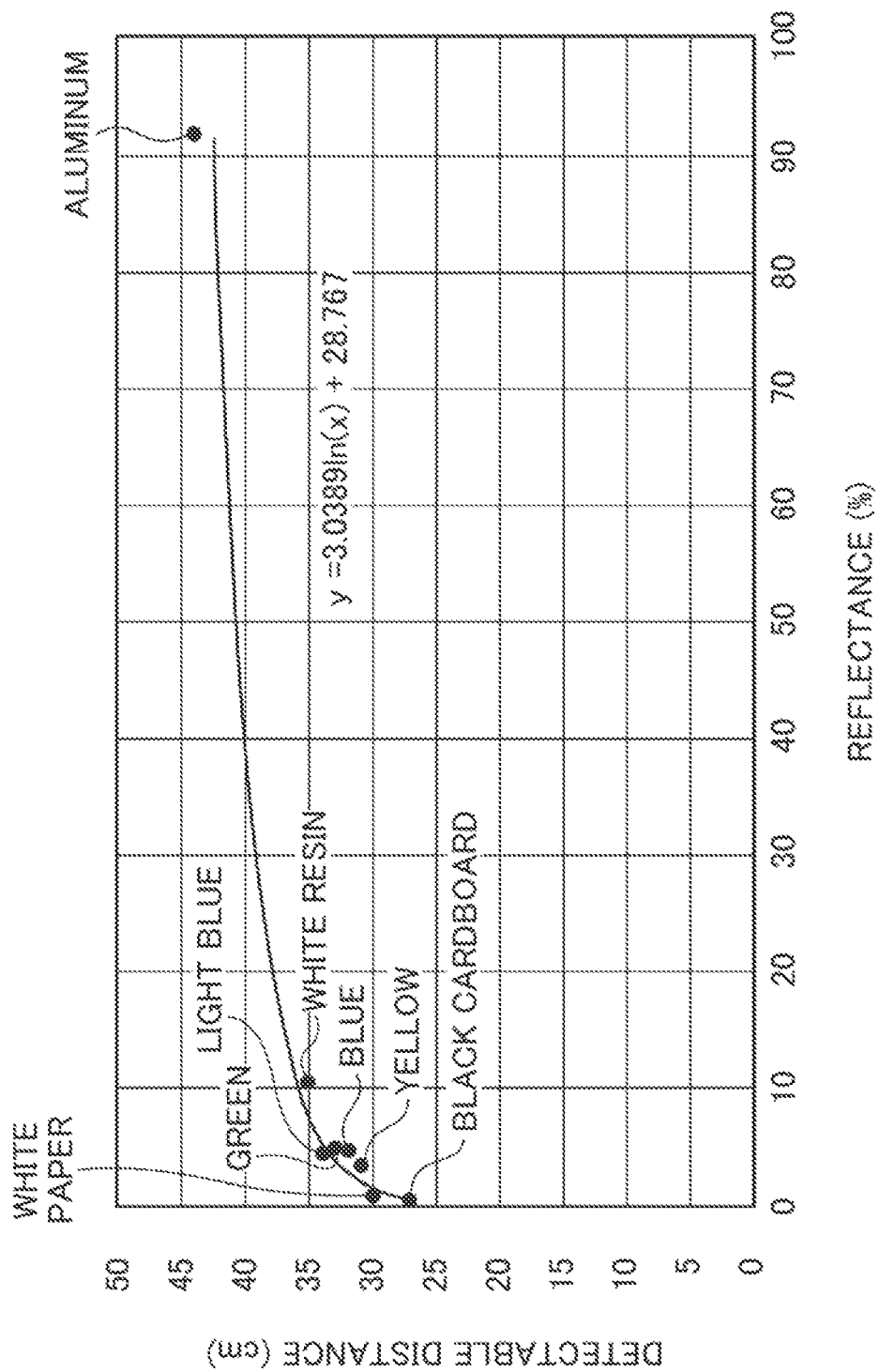
FIG. 10 is a graph depicting relationships among a color and a material of a reflecting section, reflectance of the reflecting section, and an object detectable distance of a light receiver.

Hereinafter, as a first example, examples of a color and a material of the reflecting section 124 will be described. FIG. 10 is a graph depicting relationships among a color and a material of the reflecting section 124, reflectance of the reflecting section 124, and an object detectable distance by the light receiver 134. FIG. 11 is a diagram illustrating relationships among a color and a material of the reflecting section 124, reflectance of the reflecting section 124, and an object detectable distance by the light receiver 134.

In the first example, in the detecting unit 10 according to the first embodiment, the color and the material of the reflecting section 124 were gradually changed to measure the reflectance with respect to visible light by the reflecting section 124 (hereinafter, simply referred to as "reflectance") and measure the object detectable distance in the detection target space 110A (hereinafter, simply referred to as "detectable distance") by the light receiver 134.

In the first example, the reflectance and the detectable distance were measured using visible light (520 nm) and infrared light (950 nm), respectively. The inner surface of the housing 110 was set to be black (reflectance with respect to infrared light is less than 0.1%), and the size of the housing 110 was set to be 10 cm (Z-axis) by 10 cm (X-axis) by 50 cm (Y-axis).

As depicted in FIGS. 10 and 11, according to the first example, it can be seen that, in the detecting unit 10 according to the first embodiment, the detectable distance increases as the reflectance increases. That is, it can be seen that, in the detecting unit 10 according to the first embodiment, it is possible to change the detectable distance by changing the reflectance. In particular, it can be seen that, in the detecting unit 10 according to the first embodiment, a detectable distance of 30 cm or more can be obtained by selecting a color and a material of the reflecting section 124 to obtain the reflectance of 3.4% or more. That is, in the detecting unit 10 according to the first embodiment, for obtaining the detectable distance of 30 cm or more, the reflectance of 3.4% or more is desirable that, and, the reflectance of 4.0% or more is more desirable.

As depicted in FIG. 10, the detectable distance is a logarithmic function of the reflectance. According to the logarithmic function, at the reflectance of 100%, the detectable distance of up to 42.7 cm can be obtained. This function is considered to indicate the properties or concentration of substance, such as absorbance (=−log (transmittance/100)) corresponding to transmittance. Assuming an expression for a reflecting degree corresponding to reflectance, the expression can be "reflecting degree=k×ln (reflectance/100)", indicating the properties of a reflecting material of the reflecting section.

(Relationship Between Optical Path Length and Detectable Distance of Visible Light)

Figure 12:
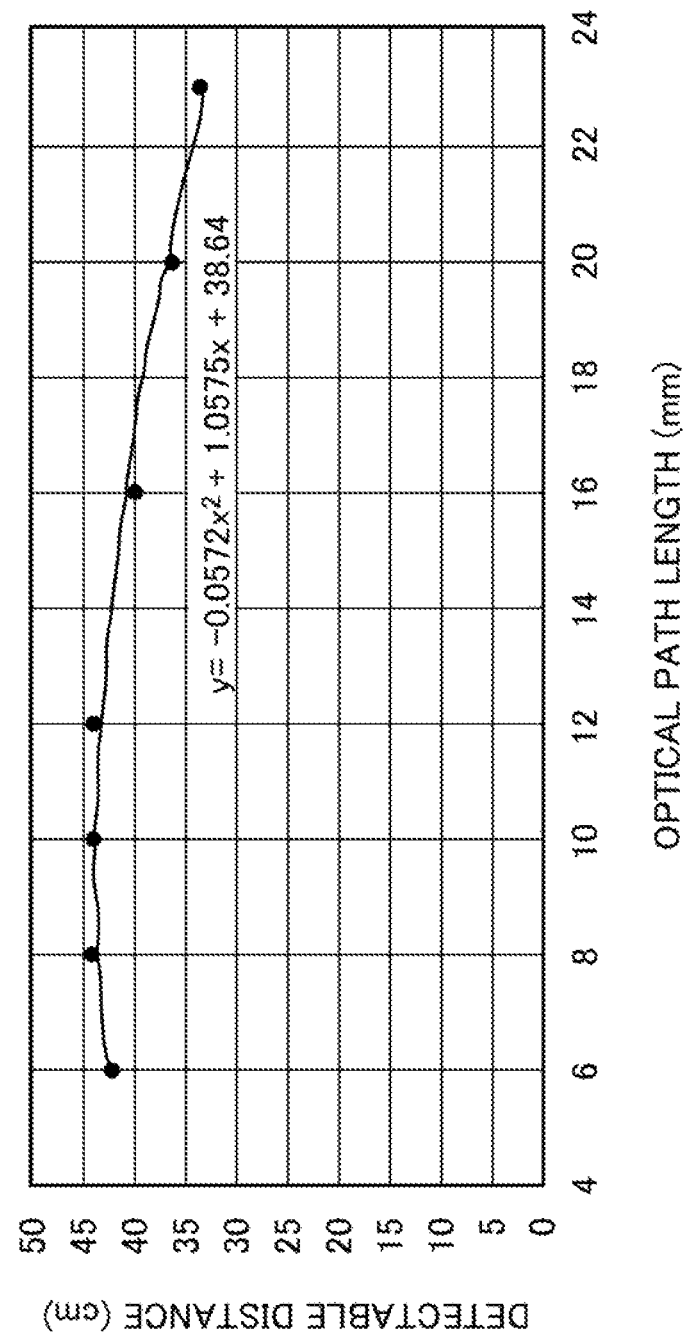
FIG. 12 is a graph depicting relationships between an optical path length of visible light and a detectable distance with respect to the detecting unit according to the first embodiment.

FIG. 12 is a graph depicting relationships between an optical path length of visible light and a detectable distance in the detecting unit 10 according to the first embodiment. In the first example, in the detecting unit 10 according to the first embodiment, the optical path length of visible light emitted by the LED 133 (hereinafter, simply referred to as the "optical path length") was gradually changed, and how an object detectable distance (hereinafter, simply referred to as a "detectable distance") by the light receiver 134 changed was observed. The "optical path length of visible light" indicates the distance from the LED 133 to the reflecting section 124. In the first example, a light blue PVC sheet (0.5 mm) was used as the reflecting section 124. In the first example, the optical path length was changed on a per 0.1 mm basis by adhering a double-sided tape of 0.1 mm on the back side of the reflecting section 124.

As depicted in FIG. 12, the detectable distance increases as the optical path length decreases, between 23 mm and 12 mm. Therefore, in the detecting unit 10 according to the first embodiment, a feature that "as the absorbance decreases in proportion to the optical path length of the visible light, the reflectance (and the object detectable distance) of the reflecting section 124 increases in inverse proportion to the optical path length of visible light" applies.

As depicted in FIG. 12, the detectable distance is almost the same between the optical path length of 12 mm and 6 mm. This is probably because the detectable distance is saturated because the visible light reflecting range is narrowed and the substantial visible light amount is reduced.

Second Example

Figure 13:
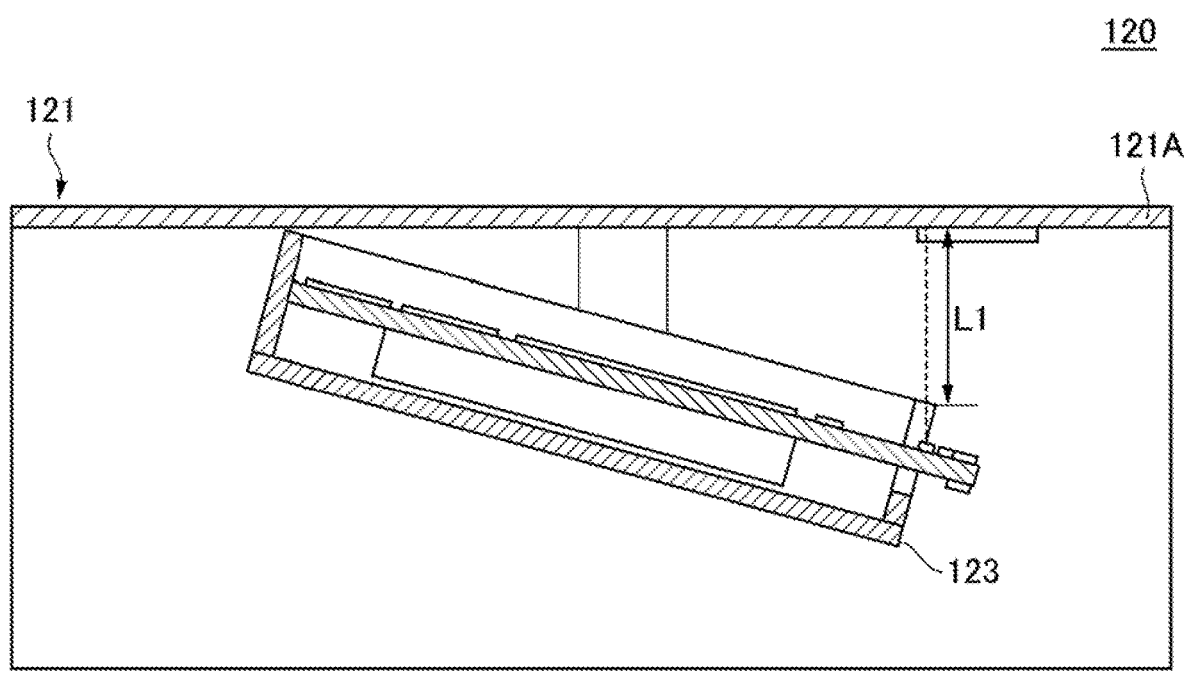
FIG. 13 depicts a distance between a case and an upper wall of a base of the detecting device according to the first embodiment.

Hereinafter, as a second example, an effect of providing a space L1 between the case 123 and the upper wall 121A of the base 121 will be described. FIG. 13 is a diagram depicting the space L1 between the case 123 and the upper wall 121A of the base 121 in the detecting device 120 according to the first embodiment. As depicted in FIG. 13, the detecting device 120 in the present embodiment has a certain amount of the space L1 between the front upper end of the case 123 and the upper wall 121A of the base 121.

FIG. 14 is a diagram illustrating an object detection result by the detecting device 120 according to the first embodiment for each amount of the space L1. In the second example, when the amount of the space L1 was changed as "0 mm", "2 mm", "4 mm", "6 mm", and "8 mm", respectively, with respect to the detecting device 120 according to the first embodiment, it was determined whether to be able to detect an object having a height of 1 cm or more that exists directly below the light receiver 134 in the detection target space 110A.

As depicted in FIG. 14, the detecting device 120 according to the first embodiment can detect an object that exists directly below the light receiver 134 with an amount of the space L1 falling within an appropriate extent (in the example depicted in FIG. 14, the distance of 4 mm or more). It can be considered that visible light emitted by the LED 133 leaks out from the case 123 in a lateral direction of the case 123 from between the case 123 and the upper wall 121A, is then reflected by the reflecting section 124, and irradiates an object directly below the light receiver 134.

Third Example

Hereinafter, as a third example, effect of adjustment of an intensity relationship between infrared light and visible light by the intensity adjusting unit 707 will be described.

Figure 15:
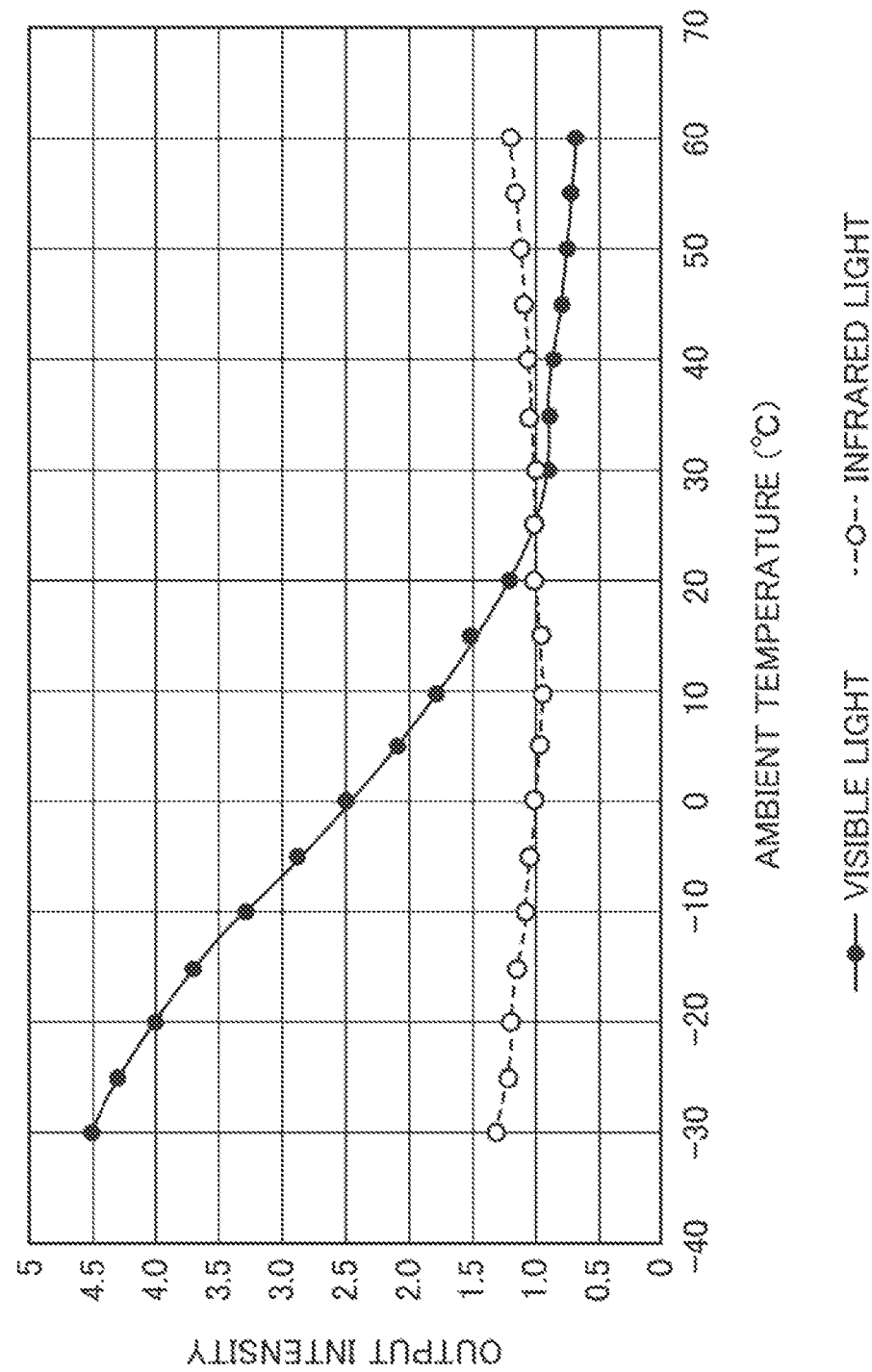
FIG. 15 is a graph depicting relationships between ambient temperature and output intensity of infrared light and visible light.

FIG. 15 is a graph depicting relationships between ambient temperature and output intensities of infrared light and visible light. As depicted in FIG. 15, output intensities of infrared light and visible light vary according to ambient temperature. Therefore, in the detecting device 120 according to the present embodiment, the intensity relationship between infrared light emitted by the LED 131 and visible light emitted by the LED 133 is adjusted with respect to the temperature of the detection target space 110A of the housing 110 by the intensity adjusting unit 707.

FIGS. 16A and 16B are diagrams illustrating object detection results with respect to ambient temperatures in the detecting device 120 according to the first embodiment. FIG. 16A depicts the object detection result when the intensity relationship between infrared light and visible light was adjusted by the intensity adjusting unit 707. FIG. 16B depicts the object detection result when the intensity relationship between infrared light and visible light was not adjusted by the intensity adjusting unit 707.

In the third example, it was determined whether to be able to detect an object at the ambient temperatures of "16° C.", "25° C.", and "34° C.", respectively, by the detecting device 120 according to the first embodiment. In the third example, in the detecting device 120 according to the first embodiment, it was determined whether to be able to detect objects having heights of less than 1 cm (3 mm and 9 mm) and 1 cm or more (1 cm, 3 cm, and 5 cm). In the third example, it was determined whether to be able to detect an object for each of detection distances "0 cm", "10 cm", "20 cm", and "30 cm" by the detecting device 120 according to the first embodiment.

According to the third example, it can be seen that the detecting device 120 according to the first embodiment can detect an object of 1 cm or more in height, not detecting an object of less than 1 cm in height, at any ambient temperature when the intensity relationship between infrared light and visible light is adjusted by the intensity adjusting unit 707, as depicted in FIG. 16A. That is, it can be seen that the detecting device 120 according to the first embodiment can avoid false detection of dust or the like at any ambient temperature by adjusting the intensity relationship between infrared light and visible light by the intensity adjusting unit 707.

According to the third example, as depicted in FIG. 16B, when the intensity relationship between infrared light and visible light by the intensity adjusting unit 707 is not adjusted, the detecting device 120 according to the first embodiment detects an object having a height of less than 1 cm when the ambient temperature is "16° C." because the intensity of visible light is relatively high. In addition, an object having a height of 1 cm or more is not detected at a detection distance of "30 cm" when the ambient temperature is "34° C." because the intensity of visible light is relatively low.

Fourth Example

Hereinafter, as a fourth example, an example of a tilt angle of the light receiver 134 with respect to the lower face of the upper wall 121A of the base 121 will be described. FIG. 17 is a diagram illustrating relationships between a tilt angle of the light receiver 134 and a detectable distance by the light receiver 134.

As depicted in FIG. 17, according to the fourth example, it is seen that, by setting the tilt angle of the light receiver 134 in a range between 11 degrees and 15 degrees, the detecting unit 10 according to the first embodiment can detect an object for a range up to the front end of the housing 110 by the light receiver 134, in other words, the detectable distance for an object by the light receiver 134 can be increased.

Fifth Example

Hereinafter, as a fifth example, an example of a color and a material of the reflecting section 124 will be described. FIG. 18 is a diagram depicting relationships between a color and a material of the reflecting section 124, and the reflectance of the reflecting section 124.

In the fifth example, in the detecting unit 10 according to the first embodiment, for each of a color and a material of the reflecting section 124, i.e., "light blue (resin 0.5 mm)", "black (resin 0.5 mm)", and "black (infrared light absorbing agent)", the reflectance of the reflecting section 124 with respect to visible light was measured, and it was determined whether to be able to detect an object in the detection target space 110A. Here, a blue polyurethane resin (a non-slip material) having a size of 2 cm by 2 cm by 2 cm was used as the object.

In the fifth example, the reflectance of the reflecting section 124 with respect to visible light was measured using each of a "green LED (520 nm)", a "yellow LED (570 nm)", and a "red LED (780 nm)" as the LED 133 emitting visible light.

As depicted in FIG. 18, according to the fifth example, as a result of the detecting unit 10 according to the first embodiment using "light blue (0.5 mm of resin)" as the color and material of the reflecting section 124, the reflectance of the reflecting section 124 with respect to visible light was able to fall between 4.5% and 5.2%, and the light receiver 134 was able to detect an object.

As depicted in FIG. 18, according to the fifth example, when each of "black (resin 0.5 mm)" and "black (infrared light absorbing agent)" was used as the color and material of the reflecting section 124, the detecting unit 10 according to the first embodiment had the reflectance of the reflecting section 124 in the range between 0% and 0.02% with respect to visible light, and the light receiver 134 was not able to detect an object.

As depicted in FIG. 18, according to the fifth example, the detecting unit 10 according to the first embodiment has almost no influence of difference in the color (wavelength) of visible light emitted by the LED 133 on the reflectance of the reflecting section 124 with respect to visible light.

In the detecting unit 10 according to the first embodiment, reflected light from the reflecting section 124 of visible light emitted by the LED 133 is irradiated onto an object in the detection target space 110A, and infrared light radiates from the object because the temperature of the object rises. As a result, the light intensity of the infrared light coming from the object can be increased. Therefore, the light receiver 134 easily detects the infrared light coming from the object.

(Variant)

Figure 19:
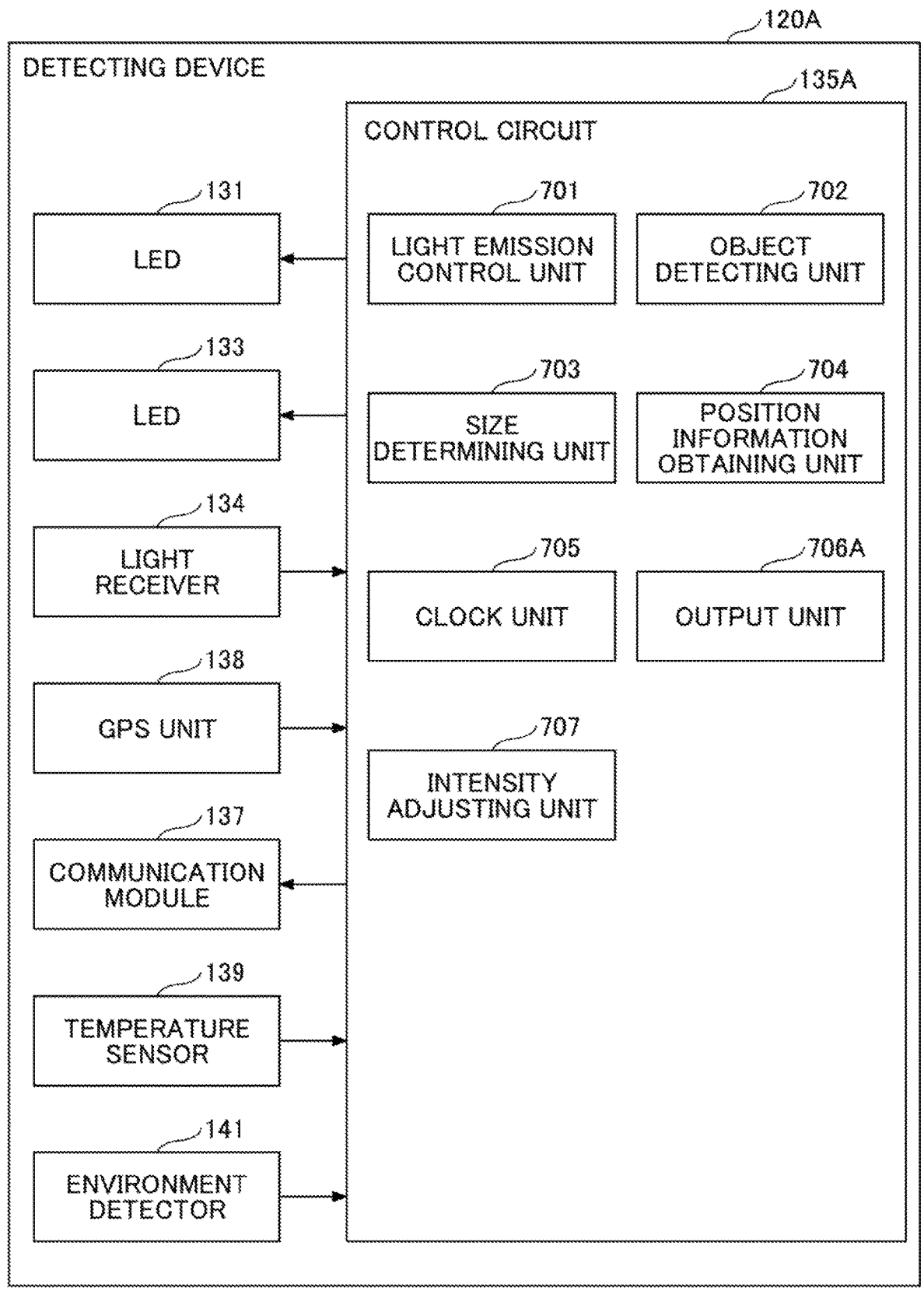
FIG. 19 is a block diagram illustrating a variant of the functional configuration of the control circuit according to the first embodiment of the invention.

FIG. 19 is a block diagram illustrating a functional configuration of the control circuit 135 according to a variant of the first embodiment of the present invention. The detecting device 120A depicted in FIG. 19 differs from the detecting device 120 in that the detecting device 120A further includes an environment detecting unit 141, and includes the control circuit 135A instead of the control circuit 135. The control circuit 135A differs from the control circuit 135 in that the control circuit 135A includes the output unit 706A instead of the output unit 706.

The environment detecting unit 141 detects environment information related to environment of the detection target space 110A of the housing 110. In the variant, the environment detecting unit 141 is an odor sensor for detecting odor. As an example of environmental information, an odor detection signal indicating odor that is detected is output to the control circuit 135A. However, environmental information is not limited to such an odor detection signal, and may be information indicating the temperature, humidity, dust concentration, or the like.

The output unit 706A of the control circuit 135A may obtain the odor detection signal from the environment detecting unit 141 and output the odor detection signal to an external apparatus via the communication module 137 in association with the object detection result obtained by the object detecting unit 702.

For example, in response to a value indicating odor becoming greater than or equal to a predetermined threshold, the output unit 706A may output, to the external apparatus, information indicating this fact, or information indicating that an object detected in the detection target space 110A is an animal or a living thing.

(Advantageous Effects of Detecting Device 120 and Detecting Unit 10)

As described above, the detecting device 120 according to the first embodiment detects an object in the detection target space 110A, and includes the LED 131 emitting infrared light into the detection target space 110A, the LED 133 emitting visible light of different wavelength from infrared light in a direction different from the emission direction of the infrared light, the reflecting section 124 in the emission direction of visible light for reflecting the visible light, and the light receiver 134 for receiving infrared light. The detecting device 120 detects an object as a result of the light receiver 134 receiving infrared light.

In this regard, the infrared light received by the light receiver 134 includes infrared light emitted by the LED 131 and reflected by the object and infrared light radiating from the object as a result of (i) the object being irradiated and thus heated by infrared light emitted by the LED 131 and (ii) the object being irradiated and thus heated by visible light emitted by the LED 133 and reflected by the reflecting section 124.

Thus, in the detecting device 120 according to the first embodiment, it is possible to change the reflectance of the reflecting section 124 to change the object detectable distance. Therefore, in the detecting device 120 according to the first embodiment, the object detectable distance can be changed without changing the infrared light output intensity.

Further, in the detecting device 120 according to the first embodiment, the direction of emitting infrared light is different from the direction of emitting visible light, so that it is possible to avoid a decrease in the object detection accuracy which would otherwise decrease due to interference between the infrared light and the visible light.

The detecting device 120 according to the first embodiment includes the output unit 706 that outputs an object detection result obtained by the object detecting unit 702 in association with position information indicating the position where the object is detected and time information indicating the time when the object is detected.

Accordingly, the detecting device 120 according to the first embodiment can output a detection position and a detection time with respect to a detected object in addition to a fact of having detected the object in the detection target space 110A of the housing 110. Accordingly, in the detecting device 120 according to the first embodiment, it is possible to obtain more detailed information regarding detection of an object.

The detecting device 120 according to the first embodiment further includes the size determining unit 703 for determining the size of a detected object based on a result of receiving infrared light coming from the object by the light receiver 134, and the output unit 706 can output the result of detecting the object obtained by the object detecting unit 702 in association with the size of the object determined by the size determining unit 703.

Accordingly, the detecting device 120 according to the first embodiment can output a size of a detected object in addition to a fact of having detected the object in the detection target space 110A of the housing 110. Accordingly, in the detecting device 120 according to the first embodiment, it is possible to obtain more detailed information regarding detection of an object.

In addition, the detecting unit 10 according to the first embodiment includes the detecting device 120 and the housing 110 having the detection target space 110A inside the housing 110, wherein the inner surface of the housing 110 has reflectance of preventing the inner surface of the housing 110 from reflecting infrared light.

Accordingly, in the detecting unit 10 according to the first embodiment, it is possible to avoid reflection of infrared light from the inner surface of the housing 110, and thus can avoid false detection of an object by the light receiver 134.

In the detecting unit 10 according to the first embodiment, the opening 111 is formed at the right-side area (in the opposite direction of the X-axis direction) of each of the front and rear walls of the housing 110. Therefore, the reflectance of the right-side area of the reflecting section 124 may be made greater than the reflectance of the left-side area of the reflecting section 124. Accordingly, the detecting unit 10 according to the first embodiment is capable of effectively detecting an object entering into the detection target space 110A through the opening 111.

Second Embodiment (Configuration of Detecting System 1000)

Figure 20:
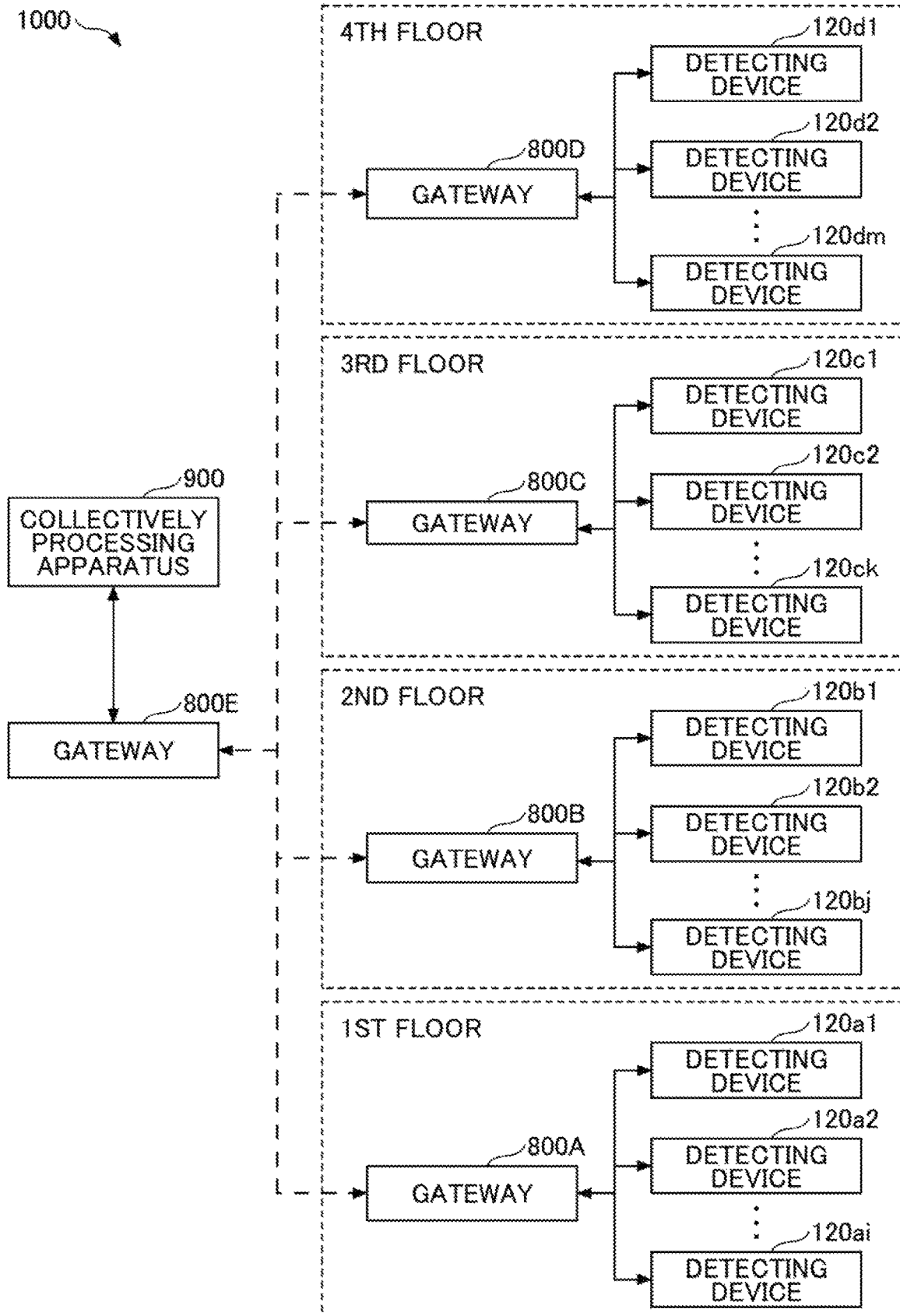
FIG. 20 is a block diagram illustrating an example of a configuration of a detecting system according to a second embodiment of the invention.

FIG. 20 is a block diagram illustrating an example of a configuration of a detecting system 1000 according to a second embodiment of the present invention. FIG. 20 depicts an example where the detecting system 1000 is applied to a building. Where to apply the detecting system 1000 is not limited to such a building.

As depicted in FIG. 20, the detecting system 1000 includes a plurality of detecting devices 120, gateways 800A-800E, and a collectively processing apparatus 900. The detecting devices 120 are located on various floors of the building. The detecting devices 120 located on the first floor of the building will be referred to as detecting devices 120a1-120ai. The detecting devices 120 located on the second floor of the building will be referred to as detecting devices 120b1-120bj. The detecting devices 120 located on the third floor of the building will be referred to as detecting devices 120c1-120ck. The detecting devices 120 located on the fourth floor of the building will be referred to as detecting devices 120d1-120dm. When the all detecting devices will be referred to, the expression "the detecting devices 120" will be used. Each of the detecting devices 120 may have the same configuration as the configuration of the detecting device 120 according to the first embodiment described above.

The gateways 800A-800E relay communication between the detecting devices 120 and the collectively processing apparatus 900. The gateways 800A-800D are located on the first through fourth floors of the building, respectively. The first floor's gateway 800A is connected to the detecting devices 120a1-120ai, collects information output from the detecting devices 120a1-120ai, and transmits the collected information to the collectively processing apparatus 900. The second floor's gateway 800B is connected to the detecting devices 120b1-120bj, collects information output from the detecting devices 120b1-120bj, and transmits the collected information to the collectively processing apparatus. The third floor's gateway 800C is connected to the detecting devices 120c1-120ck, collects information output from the detecting devices 120c1-120ck, and transmits the collected information to the collectively processing apparatus 900. The fourth floor's gateway 800D is connected to the detecting devices 120d1-120dm, collects information output from the detecting devices 120d1-120dm, and transmits the collected information to the collectively processing apparatus 900.

The collectively processing apparatus 900 collects detection results obtained from the respective detecting devices 120. In the present embodiment, the collectively processing apparatus 900 is a computer terminal, such as a personal computer, smartphone, tablet, or the like, or a server apparatus. The collectively processing apparatus 900 is an example of an "information processing apparatus". A gateway 800E is connected to the collectively processing apparatus 900. The gateway 800E is wirelessly connected to each of the other gateways 800A-800D. The collectively processing apparatus 900 and the gateway 800E are connected via a communication network (for example, Internet, wired LAN, wireless LAN, or the like) or radio communication (for example, LPWA (Low Power Wide Area)). Note that the gateways 800A-800E are not necessarily required. For example, when the collectively processing apparatus 900 is directly wirelessly connected with the gateways 800A-800D, the gateway 800E connected to the collectively processing apparatus 900 is not required. When the detecting devices 120 are directly wirelessly connected to the gateway 800E, the gateway 800A-800D connected to the detecting devices 120 are not required.

(Functional Configuration of Gateways 800A-800E)

Figure 21:
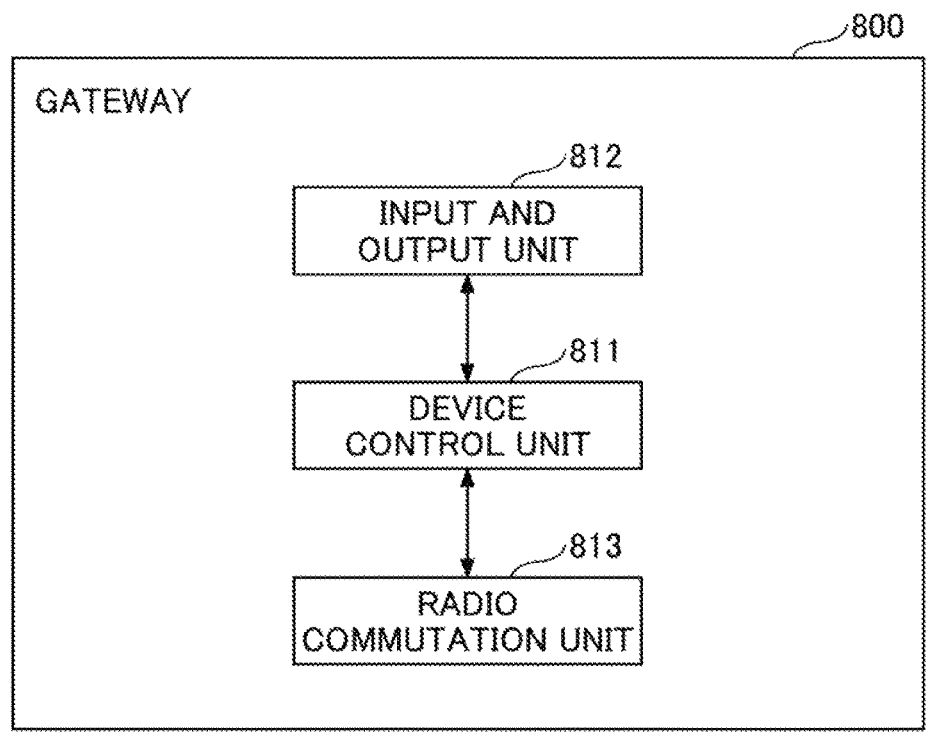
FIG. 21 is a block diagram illustrating a functional configuration of a gateway according to the second embodiment of the present invention.

FIG. 21 is a block diagram illustrating a functional configuration of each of the gateways 800A-800E according to the second embodiment of the present invention. As depicted in FIG. 21, each of the gateways 800A-800E includes a device control unit 811, an input and output unit 812, and a radio communication unit 813. The device control unit 811 controls the entire operation of the corresponding one of the gateways 800A-800E. Specifically, the device control unit 811 controls relay of transmitting and receiving of information and commands through the input and output unit 812 and the radio communication unit 813. The input and output unit 812 transmits/receives information, commands, or the like to/from the corresponding ones of the detecting devices 120 or to/from the collectively processing apparatus 900 through wired communication or radio communication. The radio communication unit 813 transmits/receives information, commands, or the like to/from the other ones of the gateways 800A-800E through radio communication.

(Hardware Configurations of Gateways 800A-800E)

Figure 22:
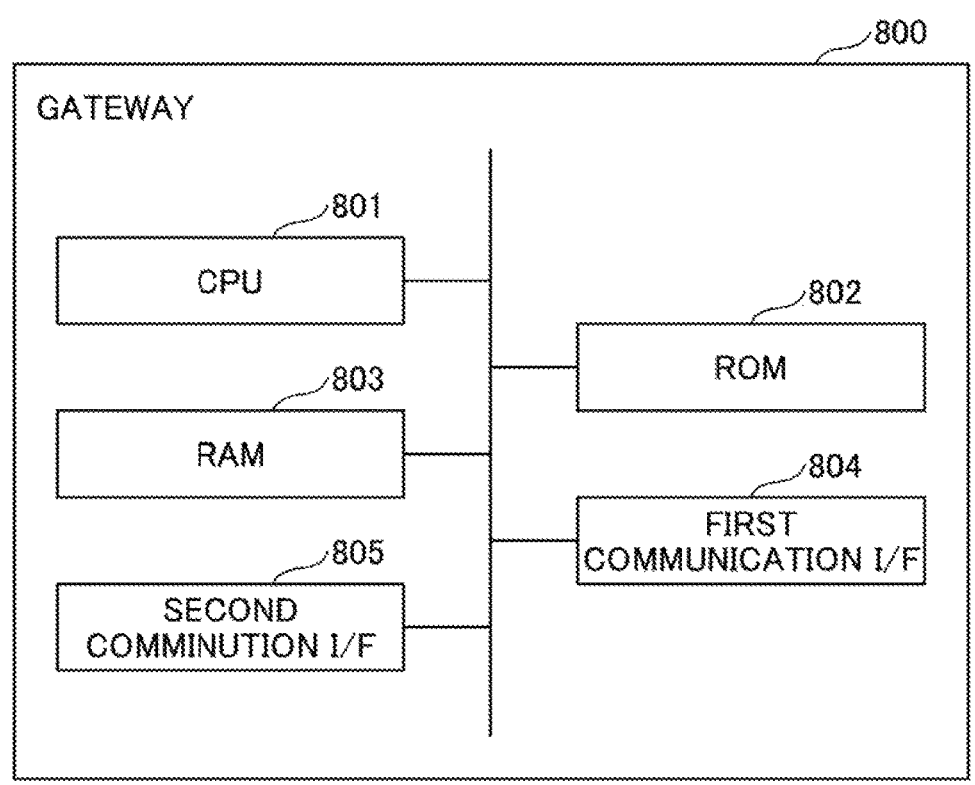
FIG. 22 is a block diagram illustrating a hardware configuration of the gateway according to the second embodiment of the present invention.

FIG. 22 is a block diagram illustrating a hardware configuration of each of the gateways 800A-800E according to the second embodiment of the present invention. As depicted in FIG. 22, each of the gateways 800A-800E includes a CPU 801, a ROM 802, a RAM 803, a first communication interface (I/F) 804, and a second communication I/F 805.

The CPU 801, ROM 802, and RAM 803 implement the functions of the device control unit 811. The functions of the CPU 801, ROM 802, and RAM 803 are similar to the functions of the CPU 201, ROM 202, and RAM 203 according to the first embodiment. The device control unit 811 may be implemented by a program execution unit such as the CPU 801, by electrical circuits, or by a combination of a program execution unit and electrical circuits.

The first communication I/F 804 implements the functions of the input and output unit 812. The second communication I/F 805 implements the functions of the radio communication unit 813. For example, the first communication I/F 804 and the second communication I/F 805 may be implemented by communication circuitry.

(Functional Configuration of Collectively Processing Apparatus 900)

Figure 23:
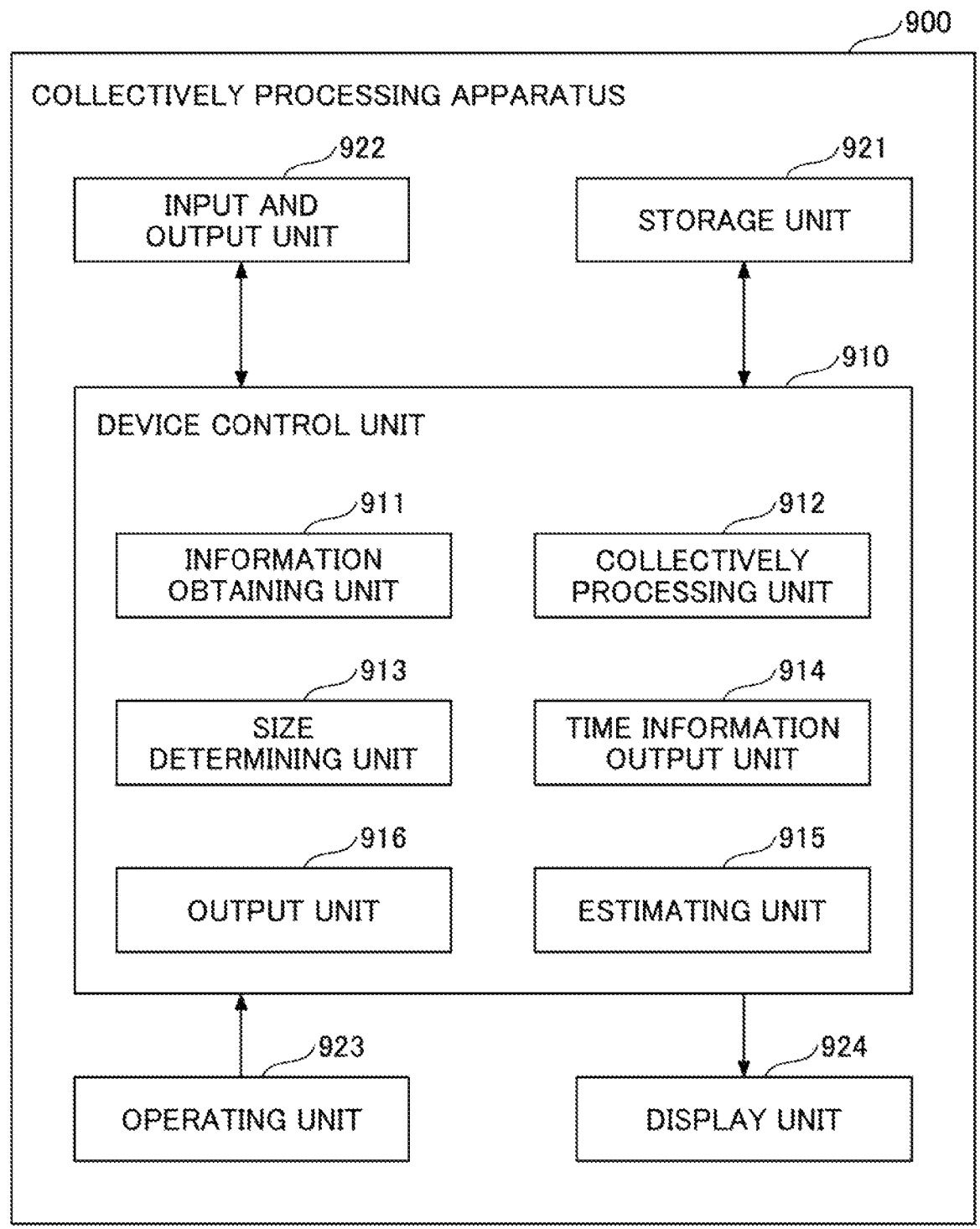
FIG. 23 depicts an example of a functional configuration of a collectively processing apparatus according to the second embodiment of the present invention.

FIG. 23 is a diagram illustrating an example of a functional configuration of the collectively processing apparatus 900 according to the second embodiment of the present invention. As depicted in FIG. 23, the collectively processing apparatus 900 includes a device control unit 910, a storage unit 921, an input and output unit 922, an operating unit 923, and a display unit 924.

The storage unit 921 stores various information. For example, the storage unit 921 stores output information or the like of the device control unit 910. The storage unit 921 may store information regarding the building in which the detecting devices 120 are disposed. For example, the information regarding the building may include the structure of the building, or the like.

The input and output unit 922 is connected to the gateway 800E through wired or radio communication and transmits/receives information, commands, or the like to/from the gateway 800E.

The operating unit 923 receives operation, information, or commands input from the user of the collectively processing apparatus 900 and outputs the received operation, information, or commands to the device control unit 910. The display unit 924 displays various information (for example, collectively processed data that will be described below).

The device control unit 910 includes an information obtaining unit 911, a collectively processing unit 912, a size determining unit 913, a time information output unit 914, an estimating unit 915, and an output unit 916.

The information obtaining unit 911 obtains information transmitted from each of the detecting devices 120 through the input and output unit 922. The information obtained by the information obtaining unit 911 includes, for example, identification information of each of the detecting devices 120, position information of each of the detecting devices 120, time information, object detection results, object size determination results, and so forth.

The size determining unit 913 determines the size of an object detected by each of the detecting devices 120 similar to the size determining unit 703 of the detecting device 120. However, when information obtained by the information obtaining unit 911 includes an object size determination result, the size determining unit 913 may determine the size of the object based on the object size determination result.

The time information output unit 914 outputs time information. For example, the time information output unit 914 may measure the current time and output time information indicating the current time similar to the clock unit 705 of the detecting device 120. However, when information obtained by the information obtaining unit 911 includes time information, the time information output unit 914 may output the time information.

The estimating unit 915 estimates a movement of a detected object from an object detection result obtained from each of the detecting devices 120. For example, the estimating unit 915 estimates the direction from one of the detecting devices 120, detecting an object, toward another one of the detecting devices 120, not detecting an object, as the direction of movement of the object, when the another one of the detecting devices 120, not detecting an object, exists around the one of the detecting devices 120, detecting the object. However, the estimating unit 915 may use any known method to estimate the direction of movement of an object.

Figure 25:
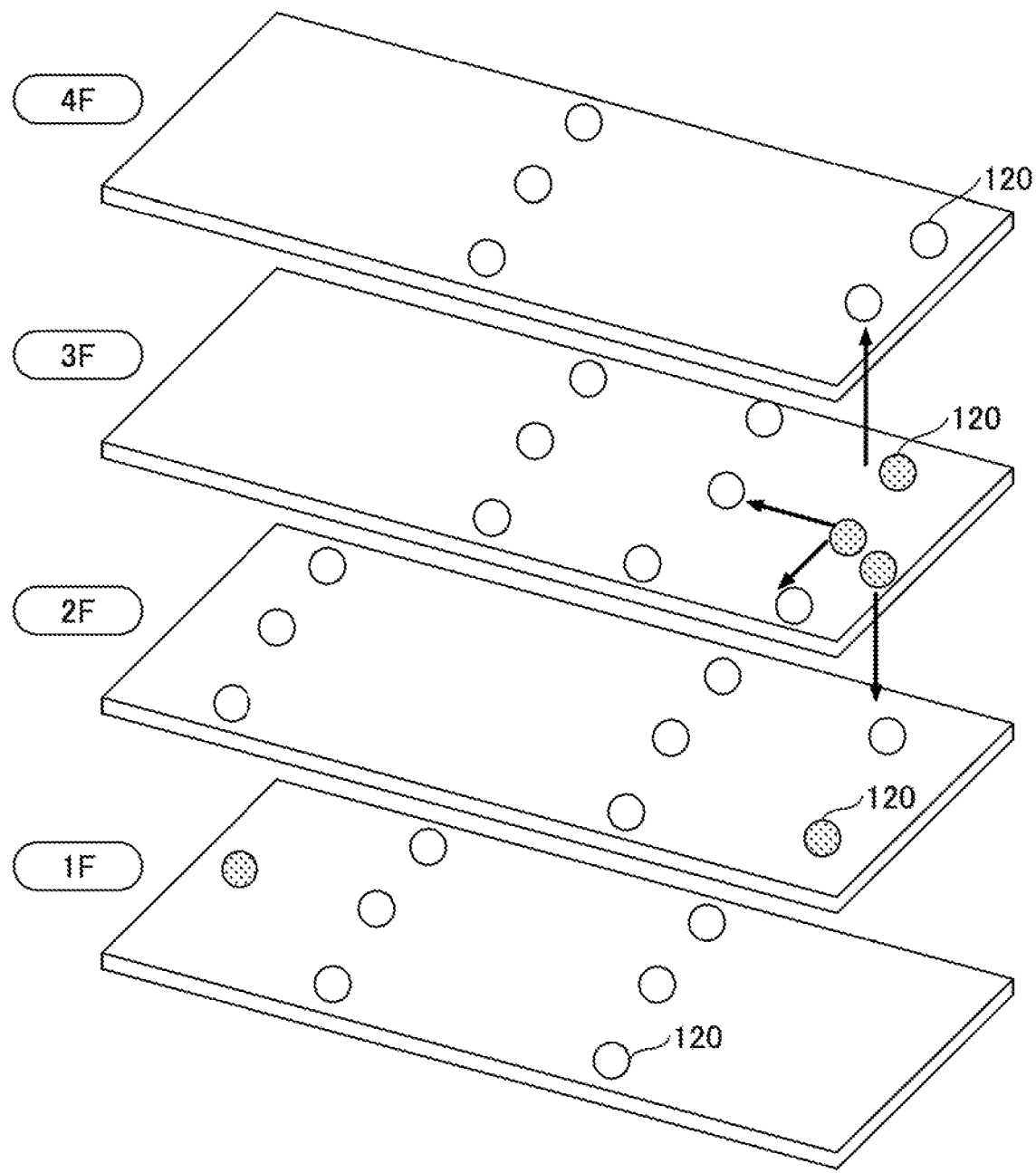
FIG. 25 depicts a second example of collectively processed data according to the second embodiment of the present invention.

The collectively processing unit 912 generates collectively processed data obtained from collectively processing information obtained from the elements of the device control unit 910. For example, the collectively processing unit 912 may collectively process information output from the information obtaining unit 911, the size determining unit 913, and the time information output unit 914 to generate collectively processed data as depicted in FIG. 24 that will be described below. For example, the collectively processing unit 912 may collectively process information output from the information obtaining unit 911, the size determining unit 913, the time information output unit 914, and the estimating unit 915 to generate collectively processed data as depicted in FIG. 25 that will be described below.

The output unit 916 outputs collectively processed data output from the collectively processing unit 912. For example, the output unit 916 displays the collectively processed data output from the collectively processing unit 912 on the display unit 924. For example, the output unit 916 stores the collectively processed data output from the collectively processing unit 912 in the storage unit 921.

(First Example of Collectively Processed Data)

FIG. 24 is a diagram illustrating a first example of collectively processed data according to the second embodiment of the present invention. In FIG. 24, collectively processed data includes information where information indicating the identification information of the detecting devices 120, information indicating whether objects have been detected, the positions of the detecting devices 120 in the building, and the date and time of detections of object are associated with each other, as depicted in FIG. 24. Collectively processed data may include information indicating the sizes of the detected objects in addition to the information of FIG. 24.

(Second Example of Collectively Processed Data)

FIG. 25 is a diagram illustrating a second example of collectively processed data according to the second embodiment of the present invention. In FIG. 25, collectively processed data includes the position of each of the detecting devices 120 in a diagram depicting each floor of the building, whether an object has been detected with respect to each of the detecting devices 120 (each of the detecting devices 120, detecting an object, being represented by a circle filled with halftone dots in the diagram), and estimated directions of movements of the detected objects (represented by arrows in the diagram).

(Hardware Configuration of Collectively Processing Apparatus 900)

Figure 26:
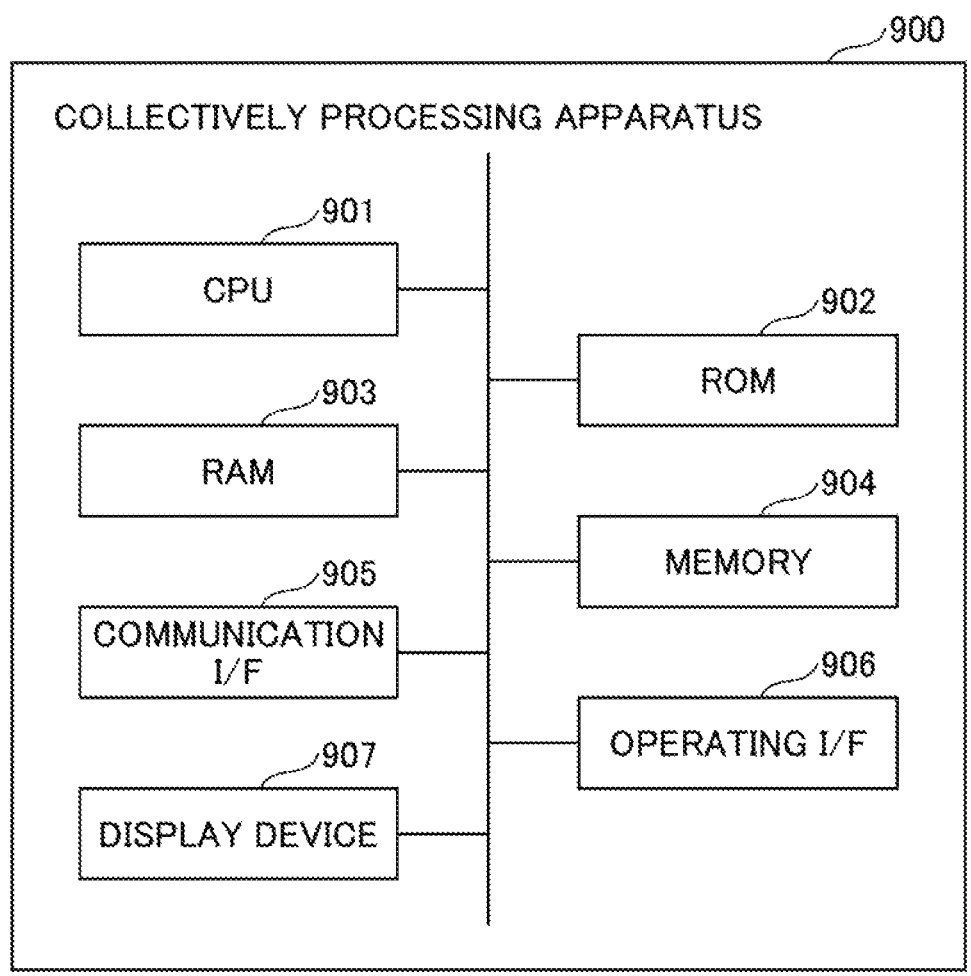
FIG. 26 is a block diagram illustrating a hardware configuration of a collectively processing apparatus according to the second embodiment of the present invention.

FIG. 26 is a block diagram illustrating a hardware configuration of the collectively processing apparatus 900 according to the second embodiment of the present invention. As depicted in FIG. 26, the collectively processing apparatus 900 includes a CPU 901, a ROM 902, a RAM 903, a memory 904, a communication I/F 905, an operating I/F 906, and a display device 907.

The CPU 901, ROM 902, and RAM 903 implement the functions of the device control unit 910 depicted in FIG. 23. The functions of the CPU 901, ROM 902, and RAM 903 are similar to the functions of the CPU 201, ROM 202, and RAM 203 according to the first embodiment. The device control unit 910 may be implemented by a program execution unit, such as the CPU 901, by electrical circuits, or by a combination of a program execution unit and electrical circuits.

The memory 904 implements the functions of the storage unit 921 illustrated in FIG. 23. The memory 904 may be a storage device such as a volatile or non-volatile semiconductor memory, a HDD, or a SSD. The memory 904 may include the ROM 902 and/or the RAM 903.

The communication I/F 905 implements the functions of the input and output unit 922 illustrated in FIG. 23. For example, the communication I/F 905 may be implemented by communication circuitry. The operating I/F 906 implements the functions of the operating unit 923. The operating I/F 906 may include input devices such as buttons, dials, keys, a touch panel, a microphone for audio input, a camera for image input, or the like.

The display device 907 implements the functions of the display unit 924 illustrated in FIG. 23. The display device 907 may be a display such as a liquid crystal panel, an organic EL (electroluminescence), an inorganic EL (electroluminescence), or an electronic paper display. The display device 907 may be a touch panel also serving as the operating I/F 906. The display device 907 may include a speaker.

(Advantageous Effects of Detecting System 1000)

As described above, the detecting system 1000 according to the second embodiment includes the plurality of detecting devices 120 and the collectively processing apparatus 900, and the collectively processing apparatus 900 includes the information obtaining unit 911 for obtaining detection result information indicating an object detection result from each of the plurality of detecting devices 120, the collectively processing unit 912 for generating collectively processed data by collectively processing the plural sets of detection result information obtained by the information obtaining unit 911, and the output unit 916 for outputting the collectively processed data generated by the collectively processing apparatus 912.

Accordingly, the detecting system 1000 according to the second embodiment can output collectively processed data obtained from collectively processing detection results of the detecting devices 120 disposed at the various locations. Further, because the detecting system 1000 according to the second embodiment can reduce false detection at each of the detecting devices 120, the accuracy of the collectively processed data can be improved.

Also, in the detecting system 1000 according to the second embodiment, the collectively processing apparatus 900 further includes the estimating unit 915 for estimating a movement of a detected object based on collectively processed data generated by the collectively processing unit 912.

This allows the detecting system 1000 according to the second embodiment to estimate a movement of a movable object.

(Variant of Functional Configuration of Collectively Processing Apparatus 900)

Figure 27:
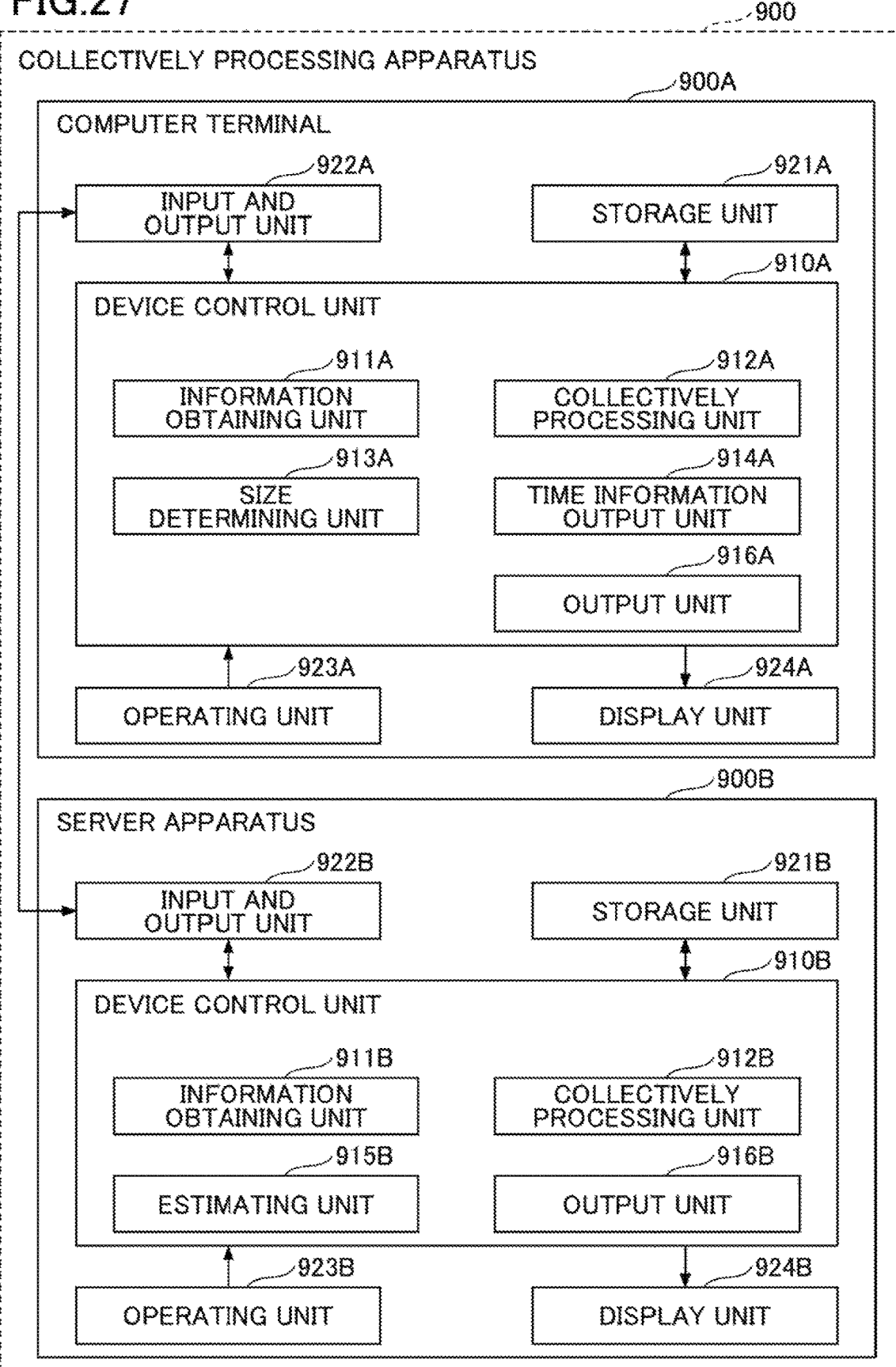
FIG. 27 is a block diagram illustrating a variant of the functional configuration of the collectively processing apparatus according to the second embodiment of the invention.

FIG. 27 is a block diagram illustrating a variant of the functional configuration of the collectively processing apparatus 900 according to the second embodiment of the present invention. For example, as depicted in FIG. 27, the collectively processing apparatus 900 may include a computer terminal 900A and a server apparatus 900B. The hardware configuration of each of the computer terminal 900A and the server apparatus 900B is the same as the hardware configuration of the collectively processing apparatus 900 according to the second embodiment.

The computer terminal 900A includes a device control unit 910A, a storage unit 921A, an input and output unit 922A, an operating unit 923A, and a display unit 924A. The device control unit 910A includes an information obtaining unit 911A, a collectively processing unit 912A, a size determining unit 913A, a time information output unit 914A, and an output unit 916A. The above-described elements of the computer terminal 900A function similarly to the same name elements of the collectively processing apparatus 900 according to the second embodiment, respectively. The input and output unit 922A is connected to the input and output unit 922B of the server apparatus 900B through wired communication or radio communication and transmits/receives information, commands, and the like to/from the server apparatus 900B. The output unit 916A outputs collectively processed data obtained from the collectively processing unit 912A to the display unit 924A, the server apparatus 900B, and so forth.

The server apparatus 900B includes a device control unit 910B, a storage unit 921B, an input and output unit 922B, an operating unit 923B, and a display unit 924B. The device control unit 910B includes an information obtaining unit 911B, a collectively processing unit 912B, an estimating unit 915B, and an output unit 916B. The above-described elements of the server apparatus 900B function similarly to the same name elements of the collectively processing apparatus 900 according to the second embodiment, respectively. The estimating unit 915B estimates a movement of a detected object with respect to each of the detecting devices 120 using information obtained from the computer terminal 900A. The collectively processing unit 912B generates collectively processed data by collectively processing information obtained from the computer terminal 900A and an estimation result of the estimating unit 915B. The output unit 916B outputs the collectively processed data generated by the collectively processing unit 912B to the display unit 924B, and so forth.

While the detection devices, detecting units, and detecting systems have been descried with reference to the embodiments and variants, the present invention is not limited to these embodiments, and various modifications or variants are possible within the scope of the invention as defined in the appended claims.

For example, the detecting device 120 may be used without the housing 110. That is, the detecting device 120 is not limited to be used for detecting an object in the detection target space 110A of the housing 110. The detecting device 120 may be used for detecting an object in another detection target space (for example, a house room).

In each of the detecting units 10 according to the embodiments and variants, the LED 133 is used to obtain increased infrared intensity in comparison to a case where only the LED 131 is used. However, the purpose of the LED 133 is not limited to this purpose. The LED 133 may be used also for another purpose. For example, the LED 133 may be used in an initialization checking operation of the detecting unit 10. In this case, when the power of the detecting unit 10 is turned on, the detecting unit 10 turns on the LED 133 for a certain period of time and the power supply conditions are checked. The detecting unit 10 then turns on the LED 131 while the LED 133 is turned off. Then, while continuously turning on the LED 131, the detecting unit 10 turns on the LED 133 and then turns off the LED 133. At this time, for example, the detecting unit 10 does not detect an object because no object exists in the detection target space 110A of the housing 110. The detecting unit 10 then sets the light receiving result of the light receiver 134 at this time as an initial reference state. Then, for a regular usage state, the detecting unit 10 determines presence or absence of an object based on a change in a light receiving result obtained through the same LED turning on/off operation pattern from the thus set initial reference state. As a result, the detecting unit 10 can detect an object without continuously turning on the LEDs 131 and 133, thereby achieving energy saving.

The ordinal numbers, quantities, and so forth described herein are all exemplary for the purpose of illustrating features of the present invention, and the present invention is not limited to the exemplary numbers. The connection relationships between the elements described herein are exemplified for the purpose of illustrating features of the present invention, and the connection relationships that achieve functions of the present invention are not limited to the connection relationships described herein.

In the functional block diagrams, the divisions of the blocks are an example, plural blocks may be implemented as one block, one block may be divided into two or more blocks, and/or some functions may be transferred to another block. The functions of plural blocks having mutually similar functions may be processed in parallel or may be processed in a time sharing manner by a single hardware or software.

The present application is based on and claims priority to Japanese patent application No. 2019-197894, filed on Oct. 30, 2019, and Japanese patent application No. 2020-106486, filed on Jun. 19, 2020. The entire contents of Japanese patent application No. 2019-197894 and Japanese patent application No. 2020-106486 are hereby incorporated herein by reference.

What is claimed is:

1. A detecting device for detecting an object present in a detection target space, the detecting device comprising:
    a first light source configured to emit infrared light and to irradiate the object present in the detection target space with the emitted infrared light;
    a second light source configured to emit second light of a wavelength different from the infrared light in a direction different from a direction in which the infrared light is emitted;
    a reflecting section provided in the direction in which the second light source emits the second light, and configured to reflect the second light to irradiate the object present in the detection target space with the reflected second light;
    a light receiver configured to receive detectable light, the detectable light including
        reflected infrared light, the reflected infrared light being infrared light that is reflected by the object being irradiated with the infrared light emitted by the first light source, and
        radiated infrared light, the radiated infrared light being infrared light that is generated by the object being irradiated with the reflected second light, wherein
            the object is simultaneously irradiated with the infrared light emitted by the first light source and the reflected second light; and
    a detector configured to detect the object based on the detectable light received by the light receiver.

2. The detecting device according to claim 1, wherein a detectable distance for the object is changeable by a change in reflectance of the reflecting section with respect to the second light.

3. The detecting device according to claim 2, wherein the reflectance of the reflecting section with respect to the second light is changeable by a change in at least one of a color and a material of the reflecting section.

4. The detecting device according to claim 1, further comprising
    at least one processor configured to output a detection result obtained by the detector with respect to the object.

5. The detecting device according to claim 4, wherein
    the at least one processor is further configured to determine a size of the object on the basis of a result of the light receiver receiving the reflected infrared light and the radiated infrared light,
    wherein
    the at least one processor is further configured to output the detection result obtained by the detector with respect to the object in association with the size of the object determined by the at least one processor.

6. The detecting device according to claim 4, wherein
    the at least one processor is further configured to output the detection result obtained by the detector with respect to the object in association with position information indicating a position at which the object is detected by the detector and time information indicating a time at which the object is detected by the detector.

7. The detecting device according to claim 4, further comprising:
    an environment detector configured to detect an environment of the detection target space,
    wherein
    the at least one processor is further configured to output the detection result obtained by the detector with respect to the object in association with environment information indicating the environment detected by the environment detector.

8. The detecting device, according to claim 1, wherein
the at least one processor is further configured to adjust, according to a temperature of the detection target, space, an intensity relationship between the infrared light emitted by the first light source and the second light emitted by the second light source.

9. A detecting unit comprising:
the detecting device according to claim 1; and
a housing having the detection target space inside the housing.

10. The detecting unit according to claim 9, wherein
an inner surface of the housing has reflectance such as to prevent the inner surface from reflecting the infrared light.

11. The detecting unit according to claim 10, wherein
the inner surface of the housing is black.

12. The detecting unit according to claim 9, wherein
the housing has at least one opening allowing the object to enter the detection target space.

13. A detecting system comprising:
a plurality of detecting devices each being configured to detect an object present in a detection target space, each detecting device of the plurality of detecting devices including:
    a first light source configured to emit infrared light and to irradiate the object present in the detection target space with the emitted infrared light;
    a second light source configured to emit second light of a wavelength different from the infrared light in a direction different from a direction in which the infrared light is emitted;
    a reflecting section provided in the direction in which the second light source emits the second light, and configured to reflect the second light to irradiate the object present in the detection target space with the reflected second light;
    a light receiver configured to receive detectable light, the detectable light including
        reflected infrared light, the reflected infrared light being infrared light that is reflected by the object being irradiated with the infrared light emitted by the first light source, and
        radiated infrared light, the radiated infrared light being infrared light that is generated by the object being irradiated with the reflected second light, wherein
            the object is simultaneously irradiated with the infrared light emitted by the first light source and the reflected second light; and
    a detector configured to detect the object based on the detectable light received by the light receiver; and
an information processing apparatus, wherein
    the information processing apparatus includes at least one processor configured to:
        obtain, from the plurality of detecting devices, a plural sets of detection result information indicating detection results obtained by the plurality of detecting devices with respect to objects, collectively process the plural sets of detection result information generate collectively processed data, and
output the collectively processed data.

14. The detecting system according to claim 13, wherein the at least one processor is further configured to estimate a movement of an object on the basis of the collectively processed data.

* * * * *